US012748060B2

(12) United States Patent
Soljacic et al.

(10) Patent No.: US 12,748,060 B2
(45) Date of Patent: Sep. 29, 2026

(54) NANOPHOTONIC SCINTILLATORS FOR HIGH-ENERGY PARTICLES DETECTION, IMAGING, AND SPECTROSCOPY

(71) Applicant: Massachusetts Institute of Technology, Cambridge, MA (US)

(72) Inventors: Marin Soljacic, Arlington, MA (US); Charles Roques-Carmes, Palo Alto, CA (US); Nicholas Rivera, Somerville, MA (US); Zin Lin, Boston, MA (US); William Li, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 163 days.

(21) Appl. No.: 18/701,792

(22) PCT Filed: Aug. 16, 2022

(86) PCT No.: PCT/US2022/040439

§ 371 (c)(1),
(2) Date: Apr. 16, 2024

(87) PCT Pub. No.: WO2023/172288

PCT Pub. Date: Sep. 14, 2023

(65) Prior Publication Data

US 2025/0137942 A1 May 1, 2025

Related U.S. Application Data

(60) Provisional application No. 63/257,611, filed on Oct. 20, 2021.

(51) Int. Cl.
*G01N 23/04* (2018.01)
*B82Y 20/00* (2011.01)
(Continued)

(52) U.S. Cl.
CPC ........... *G01N 23/04* (2013.01); *G01T 1/2002* (2013.01); *G01T 1/20185* (2020.05); *B82Y 20/00* (2013.01);
(Continued)

(58) Field of Classification Search
CPC ........... G01N 23/04; G01N 2223/1016; G01N 2223/505; G01N 23/083; G01N 23/2251;
(Continued)

(56) References Cited

U.S. PATENT DOCUMENTS 4,831,262 A * 5/1989 Govaert ............... A61B 6/4258 250/363.01
5,401,969 A * 3/1995 Basler ....................... G01T 1/28 250/363.1
(Continued)

FOREIGN PATENT DOCUMENTS

WO 2021/070175 A1 4/2021

OTHER PUBLICATIONS

International Search Report and Written Opinion mailed Nov. 15, 2023 in corresponding PCT application No. PCT/US2022/040439.

*Primary Examiner* — Irakli Kiknadze
(74) *Attorney, Agent, or Firm* — Nields, Lemack & Frame, LLC

(57) ABSTRACT

Several new techniques for designing nanophotonic scintillators which lead to optimal performance and novel functionalities. Important design concepts include the use of absorbing structures inspired by solar cells, angularly-selective structures, and metasurfaces. Scintillators based on conventionally overlooked materials (such as GaAs or GaN) are also disclosed, which are designed to reach efficiencies comparable or superior to state-of-the-art conventional scintillators (such as YAG:Ce and LYSO). Such scintillators provide important enhancement of scintillation yield arising
(Continued)

from incorporation of nanophotonic patterns. Additionally, nanophotonic scintillators designed in conjunction with image post processing algorithms (such as deconvolution algorithms, tomographic reconstruction, etc.) are disclosed. These scintillators are designed in order to increase robustness, minimize the required dose/scan time or even the number of scans required in scintillation imaging. These new designs optimize the scintillator for optimal reconstruction.

19 Claims, 26 Drawing Sheets

(51) Int. Cl.
*G01T 1/20* (2006.01)
*G21K 4/00* (2006.01)

(52) U.S. Cl.
CPC ................ *G01N 2223/1016* (2013.01); *G01N 2223/505* (2013.01); *G21K 4/00* (2013.01); *G21K 2004/12* (2013.01)

(58) Field of Classification Search
CPC ......... G01N 23/046; G01N 2223/5055; G01N 23/00; G01N 2223/419; G01N 2223/04; G01T 1/2002; G01T 1/20185; G01T 1/20; G01T 1/2018; G01T 1/202; G01T 1/2023; G01T 1/2985; G01T 7/00; G01T 1/2033; G01T 1/2008; G01T 1/201; G01T 3/06; G01T 1/2006; G01T 1/2907; B82Y 20/00; G21K 4/00; G21K 2004/12; A61B 6/4208; A61B 6/481; A61B 6/037; A61B 6/4488; Y02E 10/549
USPC .......................................... 378/62, 98.12, 19
See application file for complete search history.

(56) References Cited

U.S. PATENT DOCUMENTS

| | | | |
|---|---|---|---|
| 2014/0084174 | A1 | 3/2014 | Torres et al. |
| 2016/0313452 | A1 | 10/2016 | Hartmann et al. |
| 2019/0025441 | A1 | 1/2019 | Radivojevic et al. |

* cited by examiner

"SOLAR CELL" SCINTILLATOR

ENHANCED SEMICONDUCTOR SCINTILLATOR

THIN FILM SCINTILLATOR

ANGULAR -SELECTIVE SCINTILLATOR

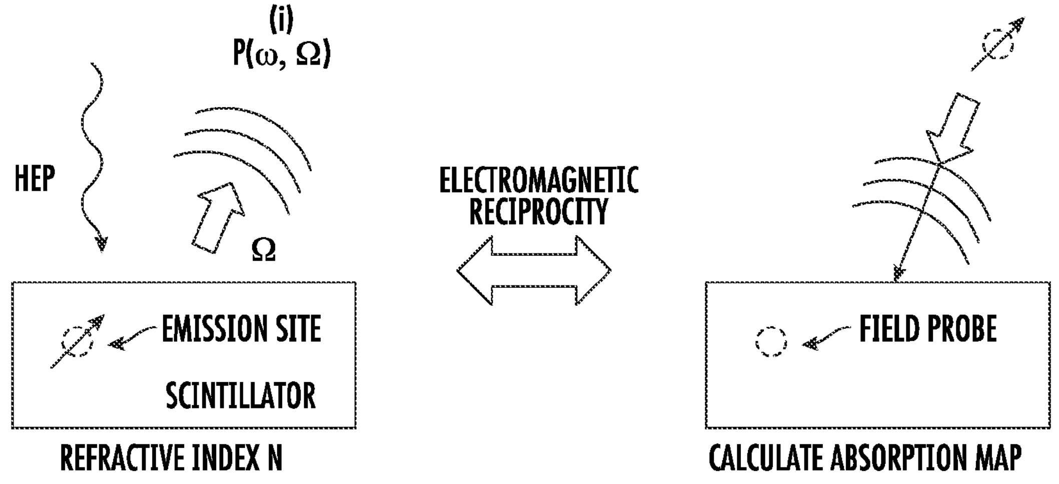
FIG. 2A
FIG. 2B
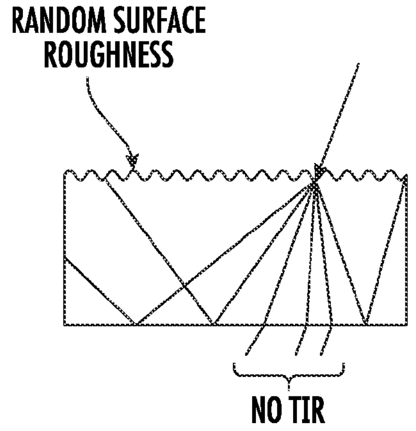
FIG. 2C
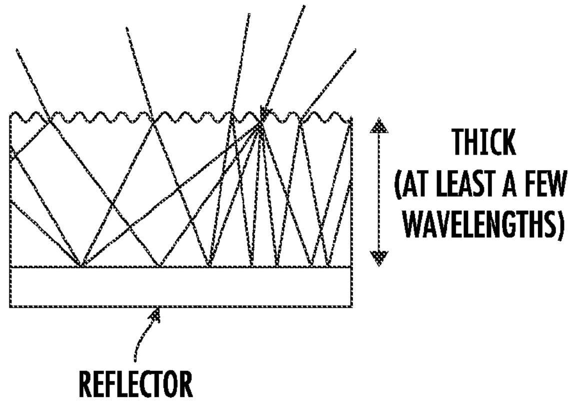
FIG. 2D
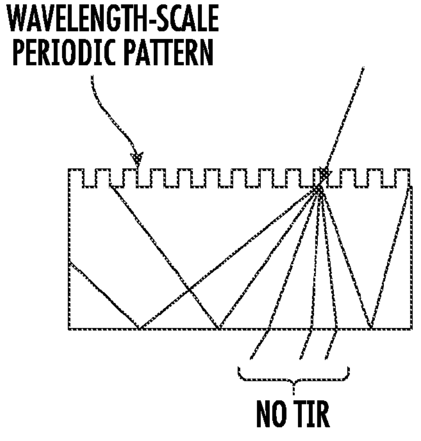
FIG. 2E
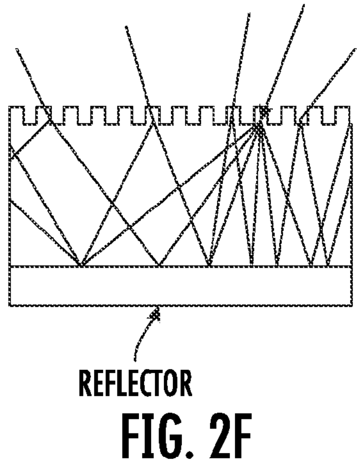
FIG. 2F 2x EFFICIENCY INCREASE
WITH NANOPHOTONIC DETECTORS

PHYSICAL OBJECT

LOW-ENERGY BIN
(GREEN SCINTILLATOR)

HIGH-ENERGY BIN
(BLUE SCINTILLATOR)

NANOPHOTONIC SCINTILLATORS FOR HIGH-ENERGY PARTICLES DETECTION, IMAGING, AND SPECTROSCOPY

This application claims priority to U.S. Provisional Patent Application 63/257,611, filed Oct. 20, 2021, the disclosure of which is incorporated by reference in its entirety.

This invention was made with Government support under Grant No. FA9550-20-1-0115 awarded by the Air Force Office of Scientific Research, Grant No. HR0011-2-09-0081 awarded by the Defense Advanced Research Projects Agency, and under Grant No. W911NF-18-2-0048 awarded by the Army Research Office. The Government has certain rights in the invention.

FIELD

This disclosure describes various nanophotonic scintillating devices and applications for these devices.

BACKGROUND

Detection of ionizing radiation (through scintillation) is ubiquitous in many applications such as medical imaging, non-destructive testing (NDT), defense, night vision, and nuclear hazard management. In medical imaging in particular, scintillation plays a key role in X-ray-based imaging, such as computerized tomography (CT) scans, dental X-rays, and mammograms. Yet, due to inefficiencies in converting X-rays into signal, X-ray imaging modalities tend to:

(1) require high doses of radiation (especially full-body CT), (2) be slow, requiring long scans, and (3) are often low-resolution, causing inconclusive images and misdiagnoses.

By improving the underlying scintillation, all three problems can be addressed, and, as a result:

(1) scans can be taken at lower doses, thus being safer, and more likely to be recommended to patients, leading to earlier detection of disease, such as cancers, (2) scans can be performed faster, providing a direct economic benefit, and (3) the rate of non- or mis-diagnoses can be reduced, avoiding costly and time-consuming follow-up procedures.

Similar limitations occur in non-destructive testing, where limited detector sensitivity results in long acquisition times to achieve reasonable scan resolution and/or brightness. In real-world settings, this dramatically limits the number of parts that can be inspected.

As a result, much research has and is devoted to finding better scintillators, with most approaches being directed towards finding new materials with better intrinsic scintillating properties.

Scintillators are ubiquitous in imaging applications and non-destructive testing where they are used in conjunction with image processing and reconstruction algorithms. For instance, compressed sensing allows medical imaging to make accurate reconstructions with fewer samples by taking advantage of the inherent sparsity in natural data, providing a way for procedures such as X-ray CT and MRI to be performed with a significant reduction in required data (and consequently a reduction in radiation dose and scan time). Two conditions are required for an imaging problem to be a good candidate for compressed sensing: first, the desired image must have a sparse representation in some known basis, and second, that basis should be incoherent with the sampling basis. In X-ray CT, it is common for reconstruction algorithms to exploit the sparsity of the gradient magnitude image (GMI) by optimizing with the total variation seminorm. Such algorithms show promise in reducing the number of projections, reducing the scanning angular range, and improving time-dependent imaging.

Therefore, it would be beneficial if there were new techniques for designing nanophotonic scintillators which lead to optimal performance and novel functionalities. Further, it would be advantageous if there were scintillators based on conventionally overlooked materials, such as GaAs and GaN, that could achieve efficiencies comparable or superior to state of the art conventional scintillators, such as YAG:Ce and LYSO.

SUMMARY

Several new techniques for designing nanophotonic scintillators which lead to optimal performance and novel functionalities. Important design concepts include the use of absorbing structures inspired by solar cells, angularly-selective structures, and metasurfaces. Scintillators based on conventionally overlooked materials (such as GaAs or GaN) are also disclosed, which are designed to reach efficiencies comparable or superior to state-of-the-art conventional scintillators (such as YAG:Ce and LYSO). Such scintillators provide important enhancement of scintillation yield arising from incorporation of nanophotonic patterns. Additionally, nanophotonic scintillators designed in conjunction with image post processing algorithms (such as deconvolution algorithms, tomographic reconstruction, etc.) are disclosed. These scintillators are designed in order to increase robustness, minimize the required dose/scan time or even the number of scans required in scintillation imaging. These new designs optimize the scintillator for optimal reconstruction.

According to one embodiment, a scintillating device is disclosed. The scintillating device comprises a substrate having a thickness, where one of the surfaces is patterned such that the scintillation outcoupling efficiency is at least 5% greater than a scintillating device without a pattern. In some embodiments, a thickness of the scintillating device is in the range of 1 micron to 10 cm. In some embodiments, the substrate is made of a material selected from the group consisting of:

- Silicon, silicon dioxide (crystalline and amorphous), rare-earth doped silicon
- Dielectric thin films, such as: $SiO_2$, $TiO_2$, $Ta_2O_5$, $Al_2O_3$, $HfO_2$, $V_2O_5$, $VO_2$, AgO, MgO
- Boron nitride (hexagonal and cubic), graphene
- Transition metal dichalcogenides
- Quantum dot and quantum well materials (e.g., CdS, AlGaAs)
- Large-bandgap material such as diamond, boron nitride, AlN
- Semiconducting materials such as GaAs, GaP, GaN, GaInN and quantum well structures (multilayer of GaN/GaInN for instance, or GaAs/InGaAs)
- Metals (and rare earths): Ag, Ta, Ni, Fe, Cr, Cu, Co, FeMn, V, Hf, Gd, Sc, Zn, Sn, Mn, TiN, TaN, Ti, Au, (and Er, Ce, Sc, Y, La, Pr, Nd, Pm, Sm, Eu, Gd, Tb, Dy, Ho, Tm, Yb, Lu)
- Nitride thin films such as AlN, SiN, HAN, GaN (doped or not), InGaN, AlGaN
- Perovskite materials (for instance $MAPbX_3$ and $CsPbX_3$ where X=Br, Cl, I)

Heavy materials (large Z)-doped dielectric structure (silica, alumina, titanium dioxide, etc.)

Materials known for their scintillation properties (doped or undoped): NaI, BGO, LSO, YSO, GSO, $BaF_2$, $CaF_2$, $CeBr_3$, Chromox, CLYC, CsI, CsI(Na), CSI(TI), GGG, GAGG(Ce), GFAG(Ce), $LaBr_3$(Ce), LBC, LSO(Ce), LuAG(Ce), LuAG(Pr), LuAP(Ce), LYSO(Ce), NB(WO), $PbF_2$, PWO, $SrI_2$(Eu), YAG(Ce), YAP(Ce), YSO(Ce), ZnSe(Te), CsI—Tl, CWO.

In some embodiments, the scintillation outcoupling efficiency is at least 10%, 20%, 50%, 100%, 200%, 500%, 1000%, 50008, 10000% or 50000% greater than a scintillating device without the pattern.

In some embodiments, the pattern comprises a random surface roughness or a periodic wavelength scale structure.

In some embodiments, both surfaces of the scintillating device are patterned. In some embodiments, a reflector is disposed on a surface that is not patterned. In some embodiments, a reflector is disposed on the patterned surface.

In some embodiments, an angular-selective structure is disposed proximate the patterned surface. In some embodiments, an angular concentration, which is defined as the amount of light exiting at a certain angular range of width 40 to the total amount of light exiting the scintillating device, is enhanced by a factor of at least 5, 10, 20, 50, 100, 500, 1000, 5000, 10000, or 50000.

According to another embodiment, an imaging set up is disclosed. The set up comprises a HEP source; the scintillating device described above, wherein a specimen is disposed between the HEP source and the scintillating device; and detector to capture light emitted from the scintillating device. In some embodiments, the patterned surface faces the detector. In some embodiments, a reflector is disposed on a surface of the scintillating device facing the specimen. In some embodiments, the patterned surface faces the specimen. In some embodiments, a reflector is disposed on an opposite surface of the scintillating device, and further comprising a beam splitter between the specimen and the scintillating device, such that HEP passes t through the beam splitter and light emitted from the scintillating device is deflected by the beam splitter toward the detector.

According to another embodiment, a scintillating device is disclosed. The scintillating device comprises a substrate having a thickness, wherein one surface of the substrate is patterned, such that light absorption of a plane wave directed from a given angle is at least 5% greater than a substrate without a patterned surface.

According to another embodiment, a scintillating device is disclosed. The scintillating device comprises a substrate having a thickness, wherein one surface of the substrate is patterned, such that light absorption from dipoles disposed at a given location is enhanced by at least 5% as compared to a substrate without a patterned surface. In some embodiments, the device hosts a photonic resonance mode that has the following properties:

the photonic resonance mode is extended along a transverse direction parallel to the patterned surface of the scintillating device; and a near-field of the photonic resonance mode at the patterned surface has a phase profile of a focusing lens.

According to another embodiment, an imaging set up is disclosed. The set up comprises an HEP source emitting HEP of various energies; a scintillating device, comprising a plurality of stacked subregions, such that different energies penetrate to different depths within the stacked subregions; and wherein each subregion comprises a patterned surface and scintillates at a specific frequency, angle and polarization; a detector to receive emissions from each stacked subregion; and a reconstruction algorithm to determine an original energy distribution based on a scintillation pattern received from the plurality of stacked subregions.

In some each subregion is designed embodiments, by calculating the HEP energy loss distribution or by inverse-design, wherein a structure of each subregion is optimized to best overlap with various HEP energy loss regions. In some embodiments, the reconstruction algorithm is selected from the group consisting of convolutional neural networks, compressed sensing solvers, and least-square error optimizers. In some embodiments, the compressed sensing solvers comprise LISTA, FISTA or iterative solvers. In some embodiments, spectroscopic reconstruction can be achieved with an error of less than 50%, 208, 108, 58, 18, 0.1% or 0.01%. In some embodiments, the reconstruction algorithm reconstructs the two-dimensional absorption map as a function of the incident energy. In some embodiments, the scintillation pattern is optimally sparse for some transform. In some embodiments, the transform comprises an edge detection function. In some embodiments, a thickness of the scintillating device is in the range of 1 micron to 10 cm.

According to another embodiment, an imaging setup is disclosed. The imaging setup comprises an HEP source emitting HEP of various energies; a scintillating device, comprising a plurality of stacked subregions, such that different energies penetrate to different depths within the stacked subregions; and wherein each subregion scintillates at a specific frequency, angle and polarization; a depth imaging device to receive emissions from each stacked subregion; a detector to receive emissions from the depth imaging device; and a reconstruction algorithm to determine an original energy distribution based on a scintillation pattern received from the plurality of stacked subregions.

BRIEF DESCRIPTION OF THE DRAWINGS

For a better understanding of the present disclosure, reference is made to the accompanying drawings, in which like elements are referenced with like numerals, and in which:

FIG. 2A shows the general scintillation concept;

FIG. 2B shows the effects of electromagnetic reciprocity;

FIG. 2C shows a scintillator with a rough surface;

FIG. 2D shows the scintillator of FIG. 2C with a reflector;

FIG. 2E shows a scintillator with a nanopatterned surface;

FIG. 2F shows the scintillator of FIG. 2E with a reflector;

DETAILED DESCRIPTION

Figure 1A:
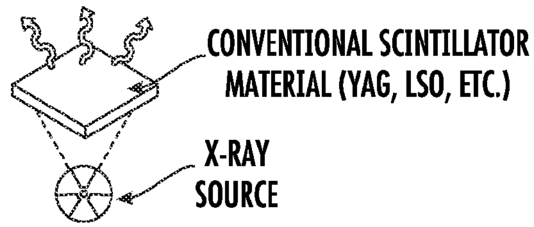
FIG. 1A shows a conventional scintillator made from heavy materials.
Figure 1B:
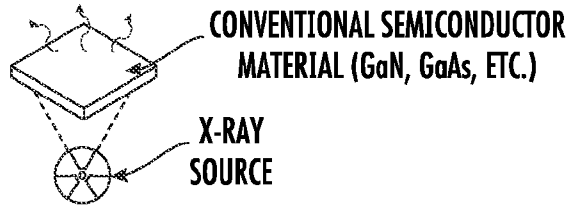
FIG. 1B shows a conventional scintillator made from semiconductor materials.
Figure 1C:
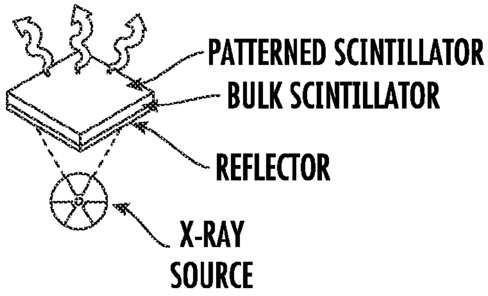
FIG. 1C shows a scintillator modelled on a solar cell.
Figure 1D:
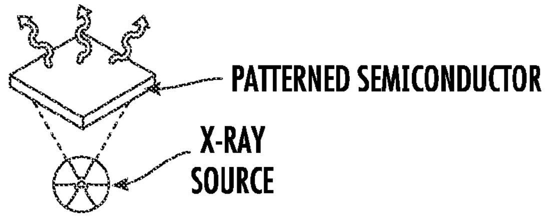
FIG. 1D shows an enhanced semiconductor scintillator having a patterned semiconductor to enhance the scintillation yield of conventional semiconductors.
Figure 1E:
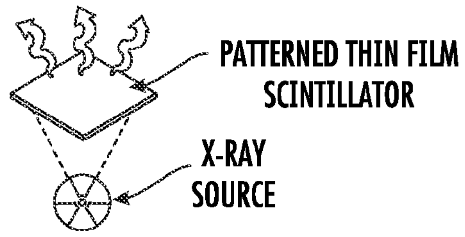
FIG. 1E shows a thin film scintillator having a patterned thin film scintillator material allowing better resolution.
Figure 1F:
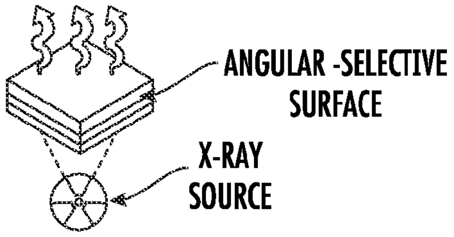
FIG. 1F shows the design of an angular-selective scintillator consisting of a back reflector, a patterned face, and an angular-selective film to enable better coupling efficiency at a narrow angular range.

According to one embodiment, various structures having improved scintillation are disclosed. FIGS. 1A-1F shows various embodiments of these structures. In each figure, an X-ray source is shown directing X-rays toward the structures. FIG. 1A shows a conventional scintillator, made of heavy materials (YAG, LSO, CsI, etc.) with high stopping powers and doped with emitting defects (rare-earth). Such materials may be hard to synthesize and may be scarce. FIG. 1B shows a conventional scintillator made with semiconductor materials which are ubiquitous, using mature nanofabrication technologies. These materials may be GaN, GaAs and others. These devices may be poor scintillator materials. FIG. 1C shows a design for a "solar cell" scintillator, which is designed in a manner similar to optimal solar cells. These devices may have a back reflector and a patterned face to allow better outcoupling efficiency. As described below, this approach is predicted to give order-of-magnitude better scintillation performance. FIG. 1D shows a design for an enhanced semiconductor scintillator having a patterned semiconductor to enhance the scintillation yield of conventional semiconductors. FIG. 1E shows a design for a thin film scintillator having a patterned thin film scintillator material, allowing better resolution with similar scintillation yield as compared to a thicker film. FIG. 1F shows a design for an angular-selective scintillator having a back reflector, a patterned face, and an angular-selective film to enable better coupling efficiency at a narrow angular range.

Figure 1G:
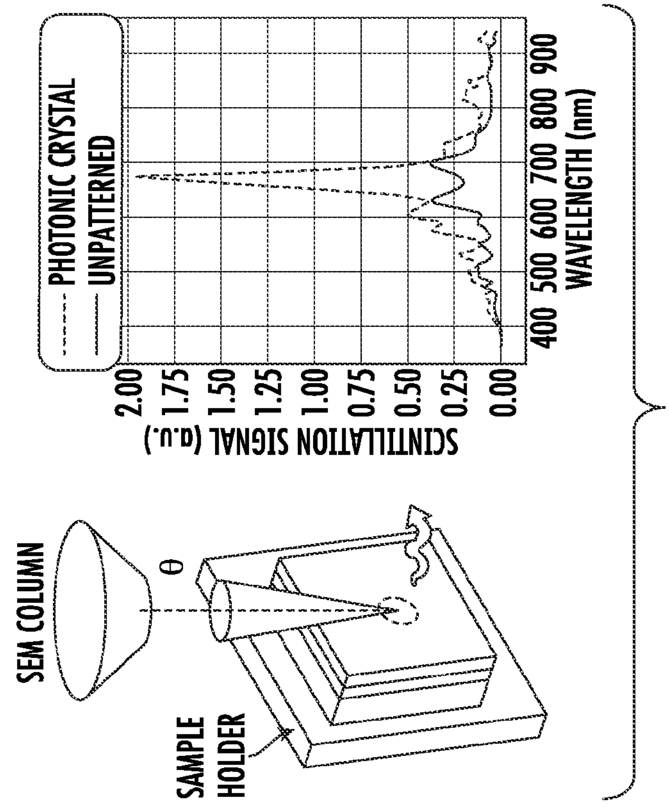
FIG. 1G shows proof-of-concept experiments that were carried out in an electron microscope, showing a factor of roughly 5 electron scintillation enhancement by patterning thin film samples into a photonic crystal.
Figure 1H:
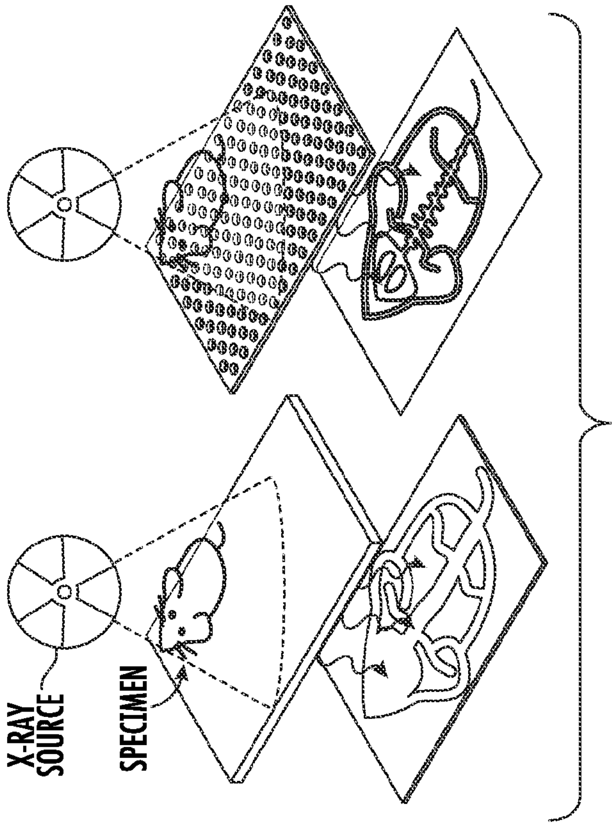
FIG. 1H shows potential applications of these scintillators.

FIG. 1G shows the setup that was used for the proof-of-concept experiments. Proof-of-concept experiments were carried out in an electron microscope, showing electron scintillation enhancement of roughly a factor of 5 by patterning thin film samples into a photonic crystal. Finally, FIG. 1H shows possible applications of these scintillators. Potential applications include high-resolution X-ray medical imaging which would enable more accurate diagnosis of images, as well as potentially automated diagnosis of images. For example, an X-ray source is used to direct X-rays through a specimen, wherein the X-rays passing through the specimen impact the scintillators and create an image.

Thus, FIGS. 1A-1F utilize various techniques that may be used in the creation of scintillators. These techniques comprise patterning the surface of the scintillators with random or periodic surface patterns, in order to increase their outcoupling efficiency. In some embodiments, the patterned face allows an increase of at least 5% in outcoupling efficiency. In other embodiments, the increase in outcoupling efficiency may be at least 10%, 20%, 50%, 100%, 200%, 500%, 1000%, 5000% or 10000%. The realized devices may also be integrated with reflectors and/or angular-selective structures. They can also be integrated in various HEP imaging modalities, as explained in more detail below.

Thus, these scintillating devices may be designed such that the total scintillation emission is enhanced by 10, 20, 50, 100, 200, 500, or 1000% with respect to the unpatterned structure without reflector.

To create these structures, it is first necessary to describe a framework by which the scintillation of a structure optical environment can be modeled. This framework is a promising and in principle material-agnostic approach to greatly improving scintillation by creating nanoscale patterns in scintillating materials. In this way, the scintillation yield can be enhanced greatly. Theoretically, with this approach, it should be possible to improve the scintillation yield by 10- or even 100-fold, enabling medical imaging which could be:

(1) so low-dose that it is nearly "radiation-free", (2) very fast, and (3) very high-resolution.

For non-destructive testing applications, this could enable much faster high-resolution scans, so that all parts on a production line could be inspected "on-the-flight".

This framework may be used to model, control, and enhance scintillation (light produced by materials bombarded with high-energy particles). Such high energy particles include, but are not limited to high-energy electrons (beta particles), photons (ultraviolet photons, X- and gamma-rays), and alpha and beta particles. Scintillation is also taken advantage of in neutron detectors (e.g., in detectors where a neutron interacts with another atom, such as $^{6}$Li, such that one of the reaction products is a charged particle such as an alpha particle). Scintillation, incoherent cathodoluminescence (scintillation by energetic electrons), and photoluminescence obey very similar physics, therefore the framework applies to all of them.

The fundamental physics associated with this disclosure is the identification of using field enhancement absorption enhancement in nanophotonic structures to enhance the optical emission of scintillator materials, enabling thinner scintillators (with higher resolution), brighter scintillators, and faster scintillators.

First, the general theory of scintillation is described. The calculation of the scintillation power (at a given frequency ω, angle of emission Ω, and polarization i) can be mapped to a calculation of absorption from dipole sources placed outside the scintillator. This technique is applicable to a wide range of nanophotonic environments, types of materials (such as scintillators only and combination of scintillating and non-scintillating materials), and types of scintillating emitters. This mapping is summarized by the following equation:

$$dP/(d\omega d\Omega) = (\pi/\omega\epsilon_0)S(\omega)\left[V_{eff}^{(i)}(\omega,\Omega)/\lambda^3\right], \quad \text{Equation (1)}$$

where $$V_{eff}^{(i)}(\omega,\Omega) = \int_V dr\left|E^{(i)}(r,\omega,\Omega)\right|^2/\left|E_{inc}^{(i)}(\omega,\Omega)\right|^2$$

is the effective absorption volume in the scintillating material. This equation allows the calculation of scintillation power spectral, angular, and polarization densities and is the centerpiece of the general framework to describe scintillation in arbitrary nanophotonic structures. This framework enables novel schemes for detection, imaging, and spectroscopy of high-energy particles (HEP) with nanophotonic scintillators.

FIGS. 2A-2B show the correspondence between scintillation and absorption calculations. In FIG. 2A, a beam of high energy particles (HEP) is bombarding a scintillator material, creating local emission sites via energy loss, ionization of band electrons, thermalization, such that spontaneous scintillation emission occurs. To calculate the scintillation emission at frequency, angle, and polarization (ω,Ω,i), one can calculate absorption in the scintillator from a dipole located in the far field, equivalent to a plane wave, as shown in FIG. 2B. In other words, electromagnetic reciprocity enables the calculation of scintillation emission by calculating absorption from dipoles located outside the scintillator. In this example, the scintillator has a refractive index of n.

"Solar-Cell" Scintillators

As can be seen from equation (1), scintillation enhancement can be achieved via absorption enhancement. In the context of solar cells, it is known that random surface roughness can result in absorption enhancements in thick slabs, where thick is defined at being at least a few wavelengths. The mechanism is as follows: in the ray optics limit, surface roughness randomizes the trajectories of ray's incident at the rough interface. In contrast, a planar interface would simply refract light according to Snell's law, with all of the light (except reflected light at the interface) going through the slab in one pass. The randomized surface scatters some of the light inside the total internal reflection (TiR) angular range, thus enabling multiple reflections of the rays, and therefore more absorption, since the total absorption is proportional to the path length of light in the absorbing volume.

This concept can be applied to enhancing scintillation, using the reciprocity framework previously developed. More specifically, by patterning the surface with randomizing roughness to the facet of the scintillator facing the direction where light is to be measured, one can enhance the out-coupled scintillating power, as shown in FIG. 2C. In the context of the Yablonovitch limit, this enhancement is typically on the order of $2n^2$ where n is the refractive index of the scintillator, when only one facet of the scintillator is rough. It becomes $4n^2$ when the other facet of the scintillator is a perfect reflector, as shown in FIG. 2D. In other words, a perfect reflector may double the scintillation enhancement.

Another approach that was proposed in the context of solar cells for absorption enhancement is to pattern the surface of structures with wavelength-scale periodic structures. There, though scattering by the patterned surface is deterministic, it enables the coupling of many plane waves to resonances in the slab. Such an approach is depicted in FIG. 2E. Similarly, the enhancement can be multiplied by another factor of two by making the other facet a perfect reflector, as shown in FIG. 2F. The expected absorption enhancement in a thick slab of thickness d with absorption coefficient do over frequency range [ω,ω+Δω] limit is given by $$\eta = \frac{1}{\Delta\omega\alpha_0 d}\sum_m \frac{2\pi\gamma_{i,m}}{N} \quad \text{Equation (2)}$$

with $\gamma_{i,m}$ the intrinsic absorption loss rate of resonance m. For thick structures $\gamma_{i,m}=\alpha_0 c/n$. There are a few essential assumptions that are used to derive this Equation:

Each resonance m has a frequency bandwidth $\gamma_{i,m}$ much narrower than the absorption bandwidth Δω: $\gamma_{i,m} \ll \Delta\omega$.

The system is operated in the over-coupling regime, such that $\gamma_{i,m} << \gamma_e$ where $\gamma_e$ describes the coupling between the resonance and the channel that carries the incident wave.

Figure 3B:
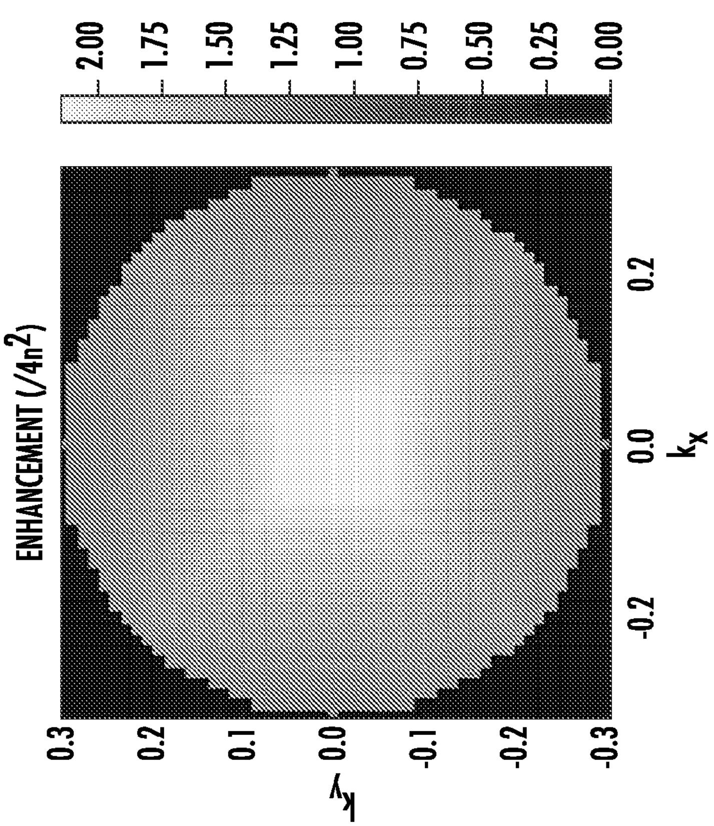
FIG. 3B shows the predicted maximum scintillation angular map over a numerical aperture of +/−17.5 degrees and a scintillation wavelength bandwidth of 540 to 560 nm (4%)
Figure 3A:
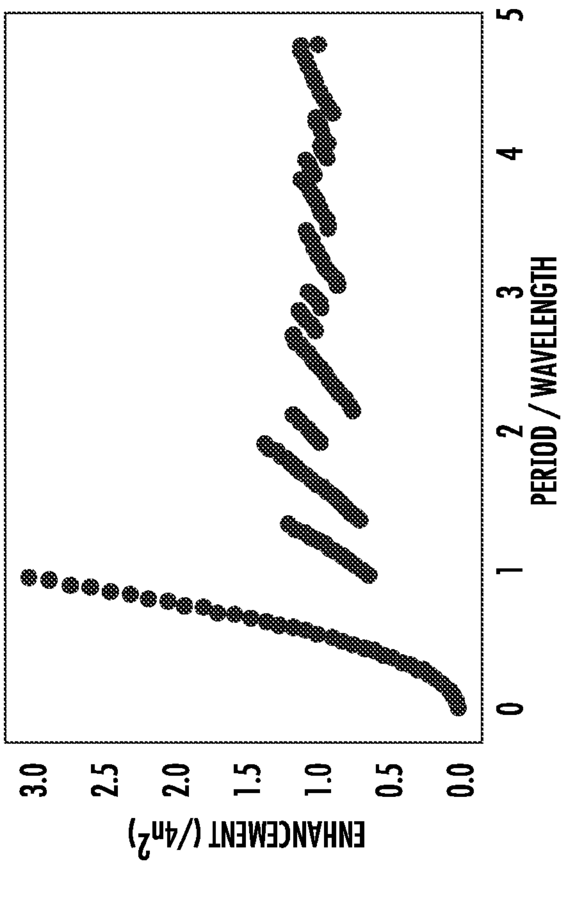
FIG. 3A shows the predicted maximum scintillation enhancement for a wavelength scale periodic structure as a function of the period.

When assuming that the slab is thick ("bulk limit"), one can simplify Equation (2) into $\eta = 4\pi n^2 (L/\lambda)^2$ for $L<\lambda$ where L is the period of the structure. The enhancement is maximized at $L=\lambda$ and equates $4\pi n^2$, an enhancement of $\pi$ with respect to the Yablonovitch limit. The full functional form of Equation (2) in the bulk limit 3A, where the vertical axis represents is plotted in FIG. enhancement and the horizontal axis is the quantity $L/\lambda$ (period/wavelength). When considering full spectral and angular bandwidths, this enhancement is reduced, as shown in FIG. 3B. FIG. 3B shows the predicted maximum scintillation angular map over a numerical aperture of +/−17.5 degrees and a scintillation wavelength bandwidth of 540 to 560 nm (4%) as a function of Bloch wavevector $k=(k_x,k_y)$. For the specific case shown there, the total enhancement is still on the order of $1.66\times 4n^2$ (with a reflector).

In certain embodiments, the total scintillation emission of the devices of FIGS. 2C-2F is enhanced by 10, 20, 50, 100, 200, 500, or 1000% with respect to an unpatterned structure without reflector. Further, in some embodiments, the scintillation imaging brightness of the devices in FIGS. 2C-2F is enhanced by 10, 20, 50, 100, 200, 500, or 1000% with respect to an unpatterned structure without a reflector.

Figure 4A:
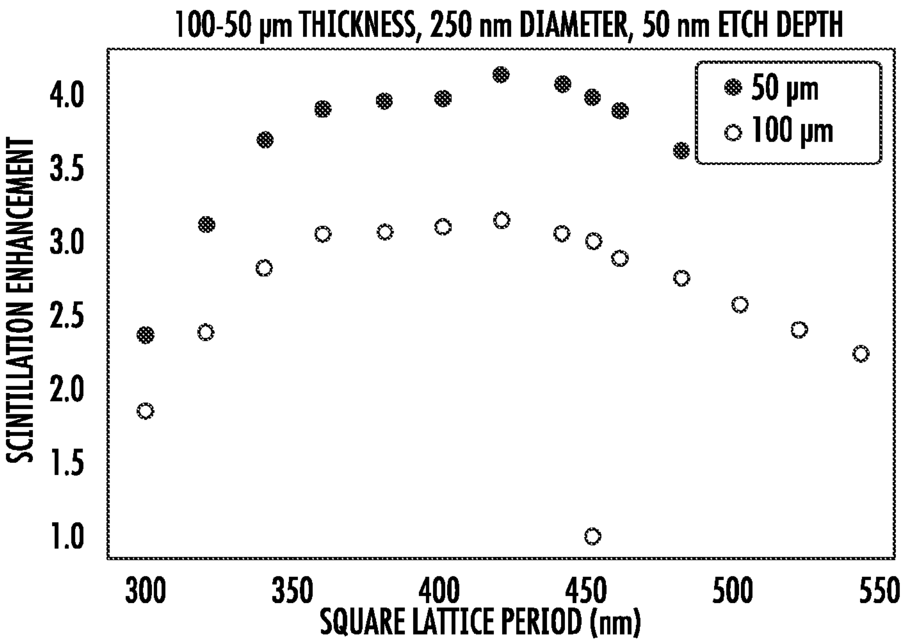
FIGS. 4A-4E show the predicted scintillation enhancement as a function of period for various parameters.
Figure 4B:
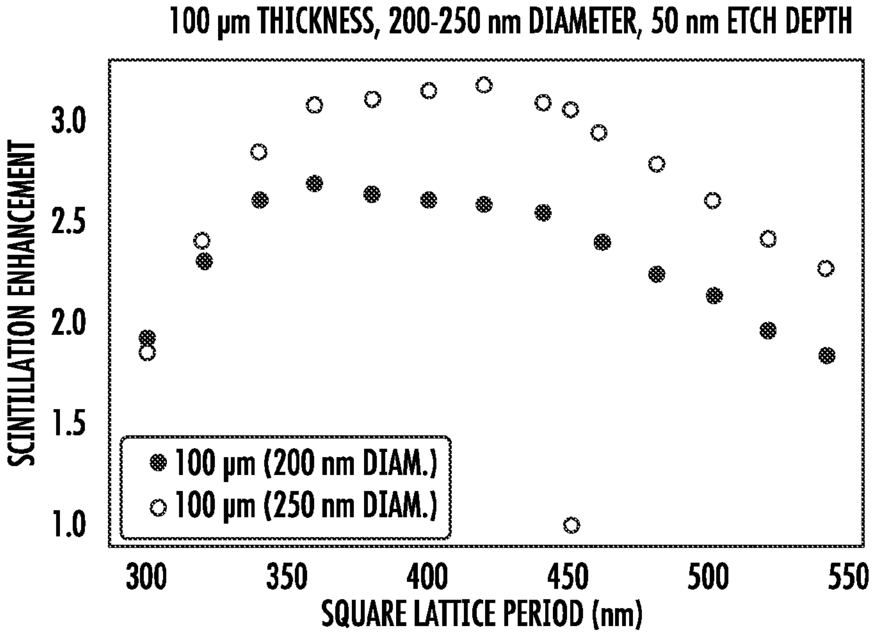
Figure 4C:
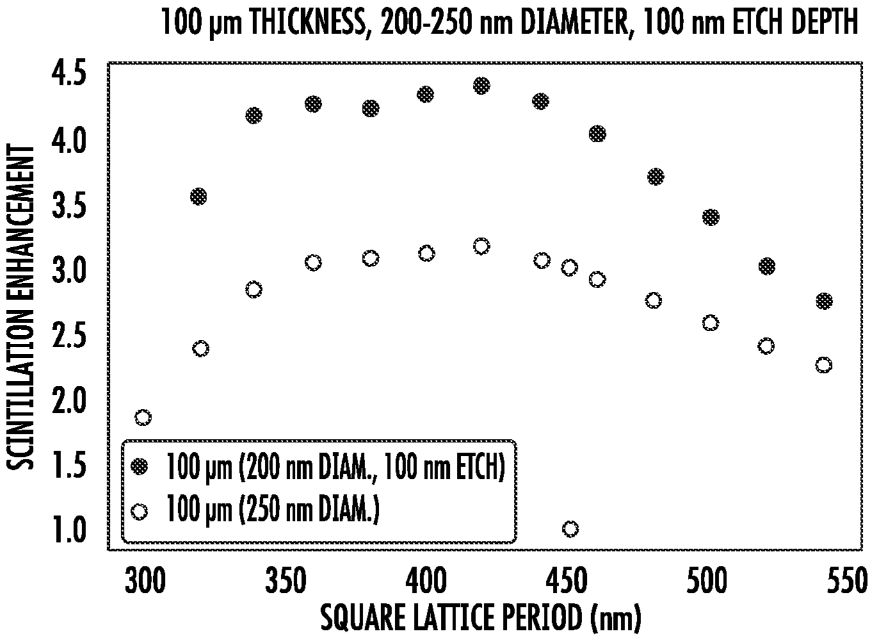
Figure 4D:
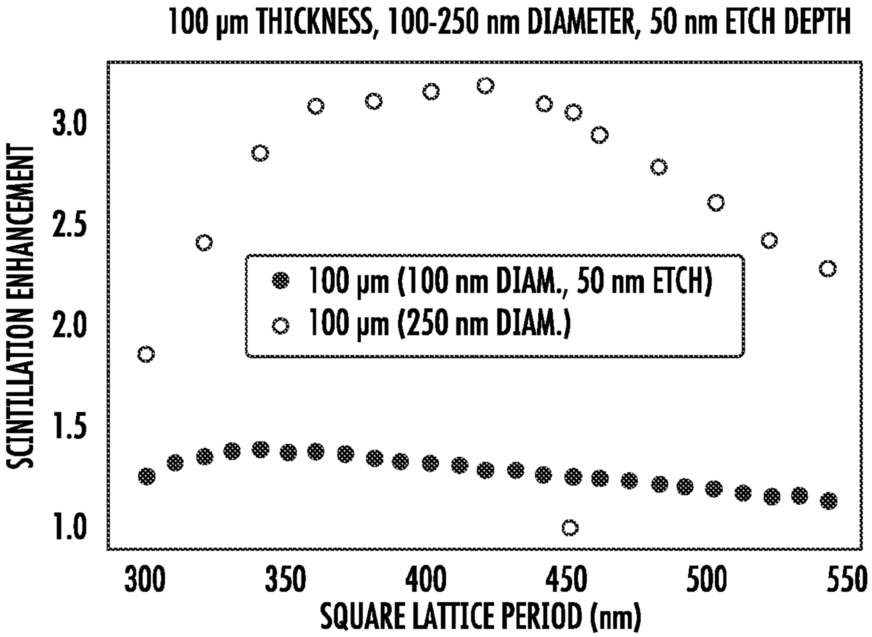
Figure 4E:
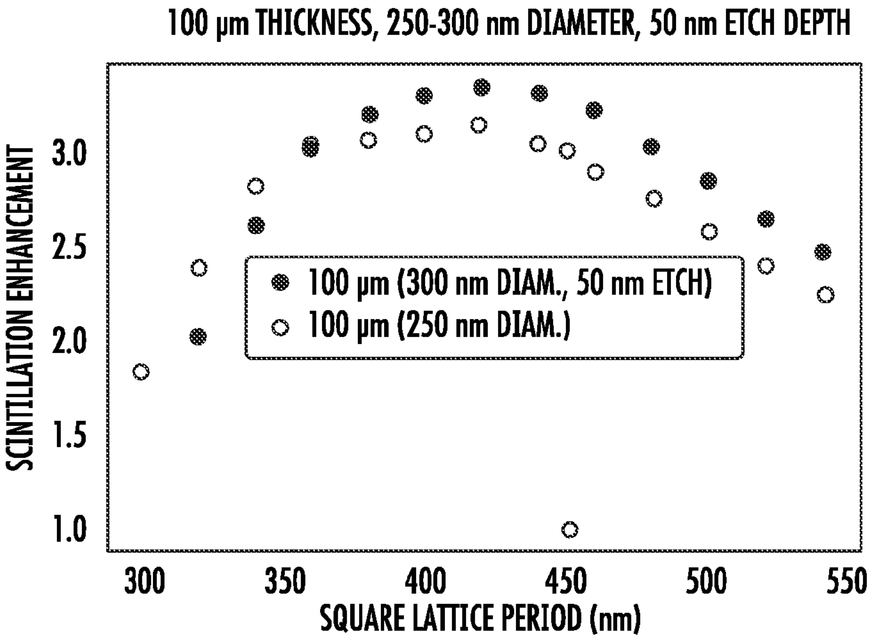
Figure 4F:
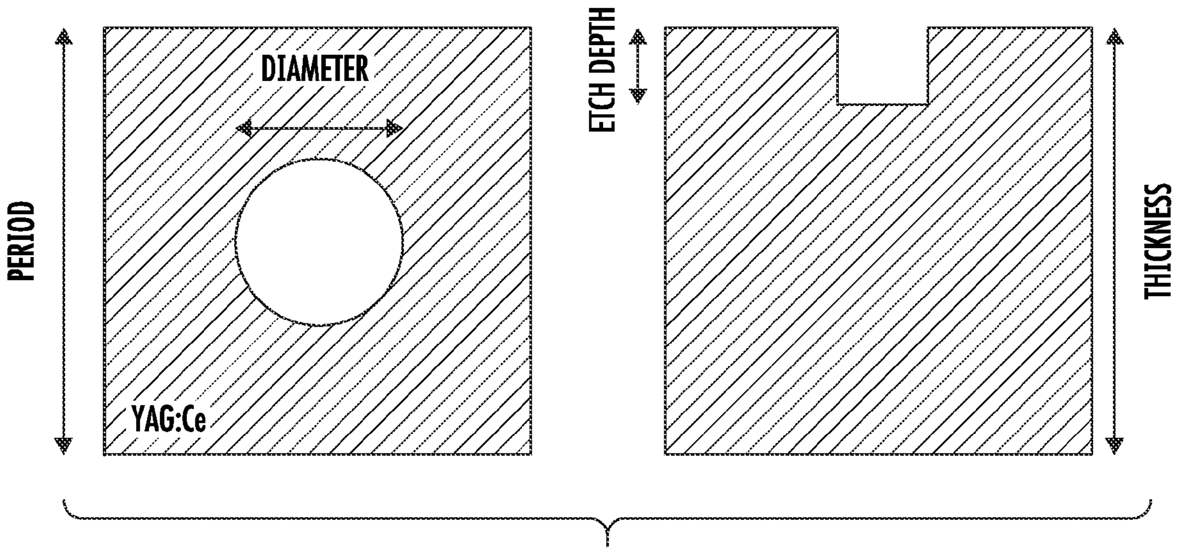
FIG. 4F shows a schematic representation of the simulated structure.

Properties of these periodic nanophotonic "solar cell" scintillators are now described. These scintillators comprise a subwavelength array of shallow holes etched into YAG:Ce, a common scintillator material. More specifically, the parameters of the structures calculated in FIGS. 4A-4E are the following: a 2D-square array of holes etched in YAG:Ce. The periodicity of the array varies between 300 and 500 nm, with hole diameter between 100 and 300 nm. The hole depth is between 50 and 200 nm, and the total thickness is in the range 5 to 1000 microns. FIG. 4F shows how each property is defined. Specifically, FIG. 4A shows the predicted scintillation enhancement as a function of period for thicknesses of 50 μm and 100 μm, where all other parameters are kept constant. Specifically, in this figure, the holes have a diameter of 250 nm and a depth of 50 nm. FIG. 4B shows the predicted scintillation enhancement for a 100 μm scintillator as a function of period for hole diameters of 200 nm and 250 nm, where the etch depth is 50 nm, the thickness is 100 μm, and all other parameters are kept constant. FIG. 4C shows the predicted scintillation enhancement as a function of period for hole diameters of 200 nm and 250 nm, where the etch depth is 100 nm, the thickness is 100 μm, and all other parameters are kept constant. FIG. 4D shows the predicted scintillation enhancement as a function of period for diameters of 100 nm and 250 nm, where the etch depth is 50 nm, the thickness is 100 μm, and all other parameters are kept constant. FIG. 4E shows the predicted scintillation enhancement as a function of period for diameters of 250 nm and 300 nm, where the etch depth is 50 nm, the thickness is 100 μm, and all other parameters are kept constant.

Based on these graphs, the expected scintillation enhancement, taking into account realistic values of optical absorption in YAG:Ce, is in the range 1.5 to 5, depending on the exact geometrical parameters.

Figure 5A:
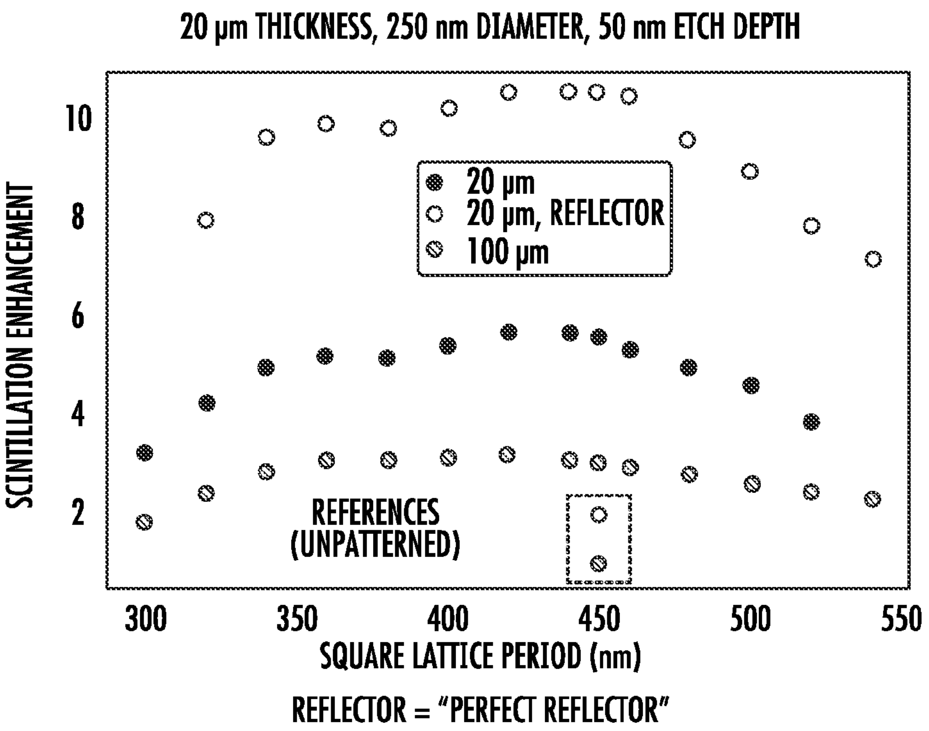
FIGS. 5A-5D shows the predicted scintillation enhancement with various thicknesses and reflectors.
Figure 5B:
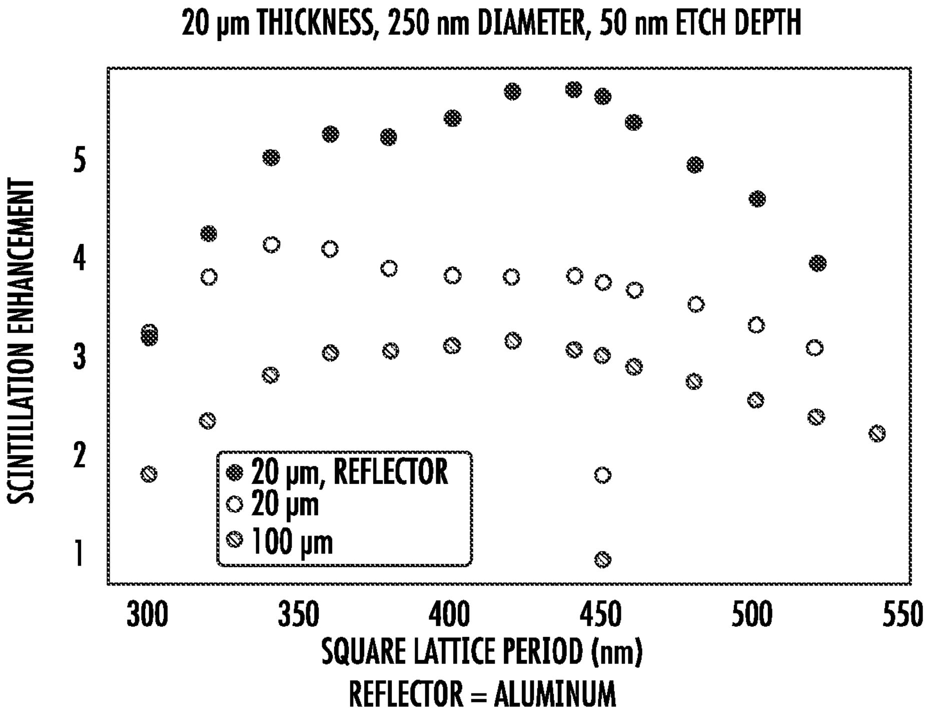
Figure 5C:
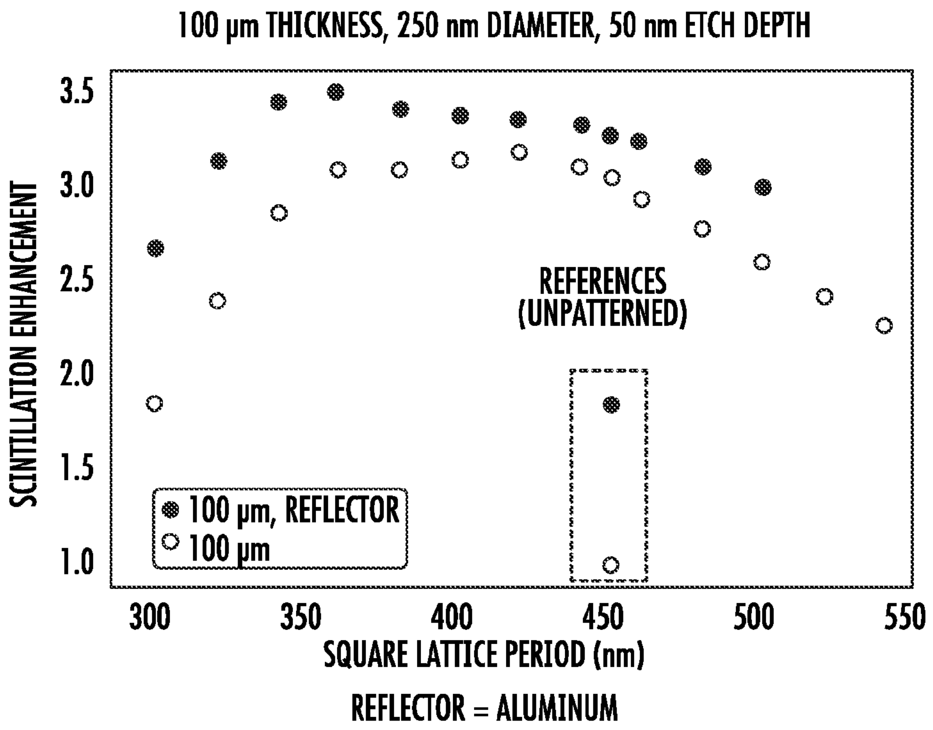

FIGS. 5A-5D show the influence of an imperfect reflector, corresponding to infinite permittivity, which can be added on the backface of the scintillator to increase the scintillation enhancement value (with respect to the unpatterned, without reflector case which is shown in the boxes in FIGS. 5A and 5C). As shown in FIG. 5A, with a perfect reflector, the enhancement is expected to be multiplied by a factor of two, compared to the case without a reflector (but patterned). FIG. 5A shows the scintillation enhancement using a 20 μm thick slab, with 250 nm diameter holes and a 50 nm etch depth with and without a reflector. In FIGS. 5A-C, two reference points are shown on the image with enhancements of 1 (corresponding to the unpatterned structure without reflector) and 2 (corresponding to the unpatterned structure with reflector), respectively. As expected, a perfect reflector results in nearly twice the scintillation enhancement. With the structures described in the previous paragraph (YAG:Ce with 20-100 microns thicknesses), in the presence of a perfect reflector, the expected scintillation enhancement can be as high as 10. Greater enhancements can be realized with lower losses and larger refractive indices materials.

Figure 5D:
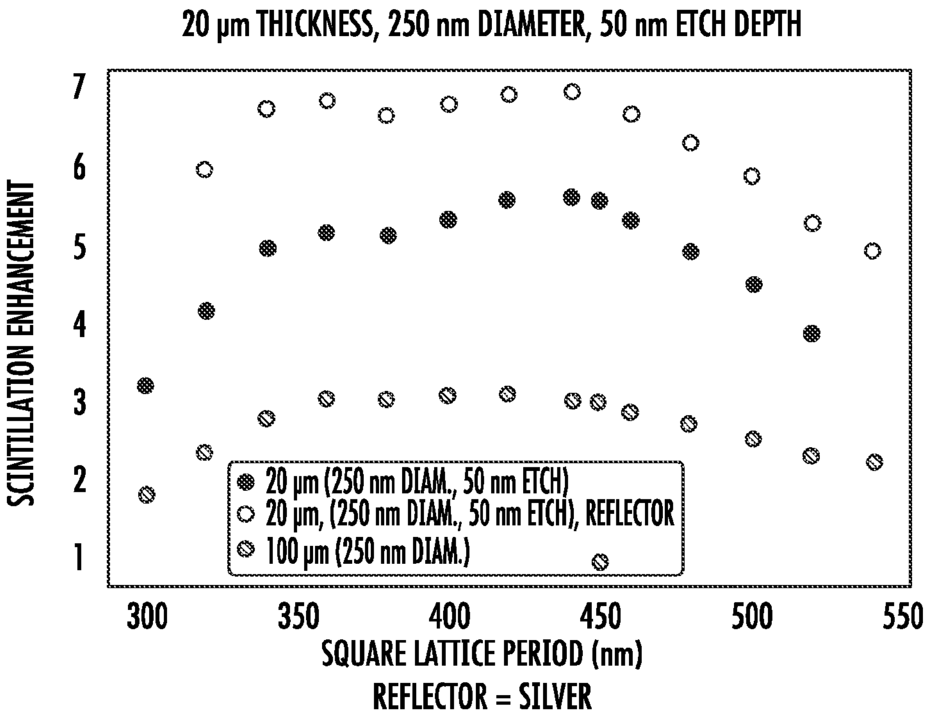

When the reflector has a finite permittivity, the enhancement is lower. FIGS. 5B-5D show the scintillation enhancement using aluminum or silver as the reflector material. Here, the material under study is YAG:Ce, whose scintillation peak is at 550 nm. Using scintillator materials emitting at longer wavelengths (typically >800 nm) should ease the material constraint on finding a good reflector. The scintillation enhancement may be roughly 3 for a 100 μm thick scintillator slab with an aluminum reflector, as shown in FIG. 5C. As shown in FIG. 5D, enhancements on the order of 7 can be achieved with a 20 μm thick slab using a silver reflector.

Figure 6A:
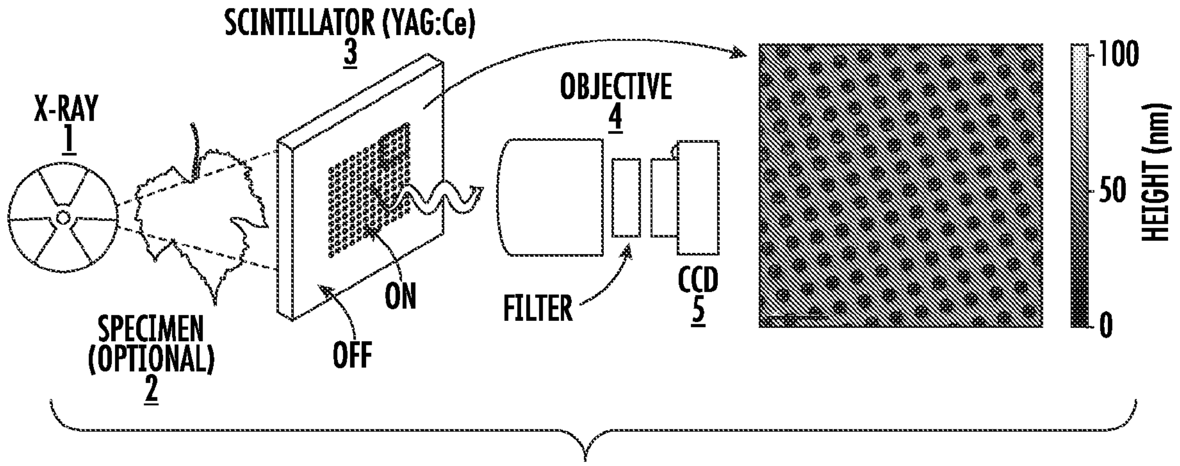
FIG. 6A shows the experimental setup and the scanning electron micrograph of patterned YAG:Ce scintillator.

FIGS. 6A-6G show the scintillation enhancements. Single-shot X-ray scans of various biological and inorganic specimens were recorded with nanophotonic scintillators embedded in YAG:Ce. The experimental configuration is shown in FIG. 6A: X-rays from an X-ray source 1 traverse a specimen 2, resulting in a magnified X-ray absorption map, transforming into a scintillating pattern at the surface of a YAG:Ce screen, which may be 50 or 100 μm thick. The scintillator surface is imaged using imaging optics 4, such as an objective and a detector 5, such as a CCD camera. In FIG. 6A, the scanning electron micrograph of patterned YAG:Ce scintillator is viewed using a scale bar of 500 nm.

A photonic crystal (PhC) is etched via Focused Ion Beam (FIB) lithography at the surface of the scintillator facing the objective. The PhC period is 430 nm and the total patterned area is 430 μm×430 μm. For this plot the imaginary part of the permittivity of YAG:Ce is taken to be $\epsilon_i = 1.84\times10^{-5}$. According to the scintillation framework developed in the previous sections, scintillation enhancement is to be expected when the absorption of light is enhanced.

Figure 6B:
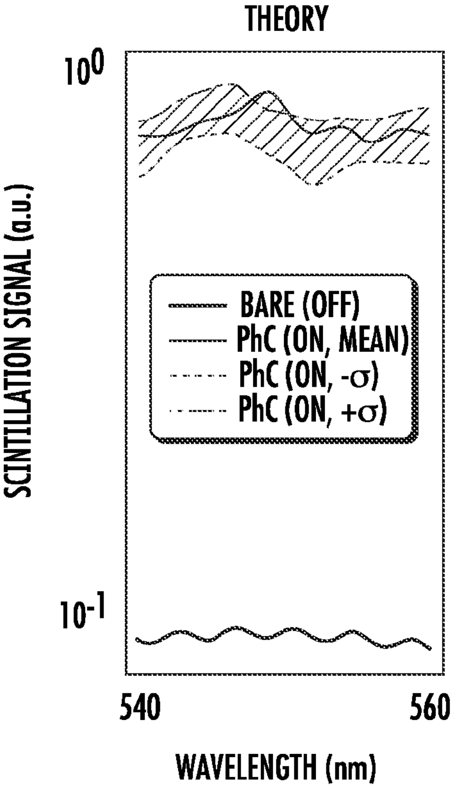
FIG. 6B shows the calculated absorption of the X-ray nanophotonic scintillator, integrated over the experimental angular aperture.

FIG. 6B shows the wavelength-dependent absorption in YAG:Ce (averaged over the angular acceptance of the objective) for an unpatterned thick (50 μm) film, as well as for the PhC sample. The PhC features a large number of high-Q resonances as could be expected from a photonic crystal slab. Over any finite bandwidth, the average absorption effectively takes the same shape as that of the unpatterned sample, but enhanced. Here, the enhancement is by a factor of ~2.4 over the measured scintillation spectrum.

Figure 6C:
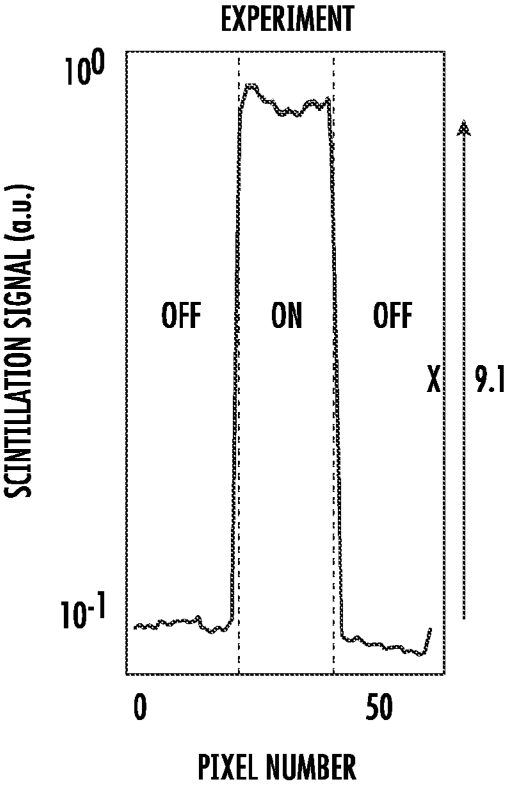
FIG. 6C shows the measured scintillation enhancement on and off the photonic crystal.
Figures 6D, 6E, 6F, 6G:
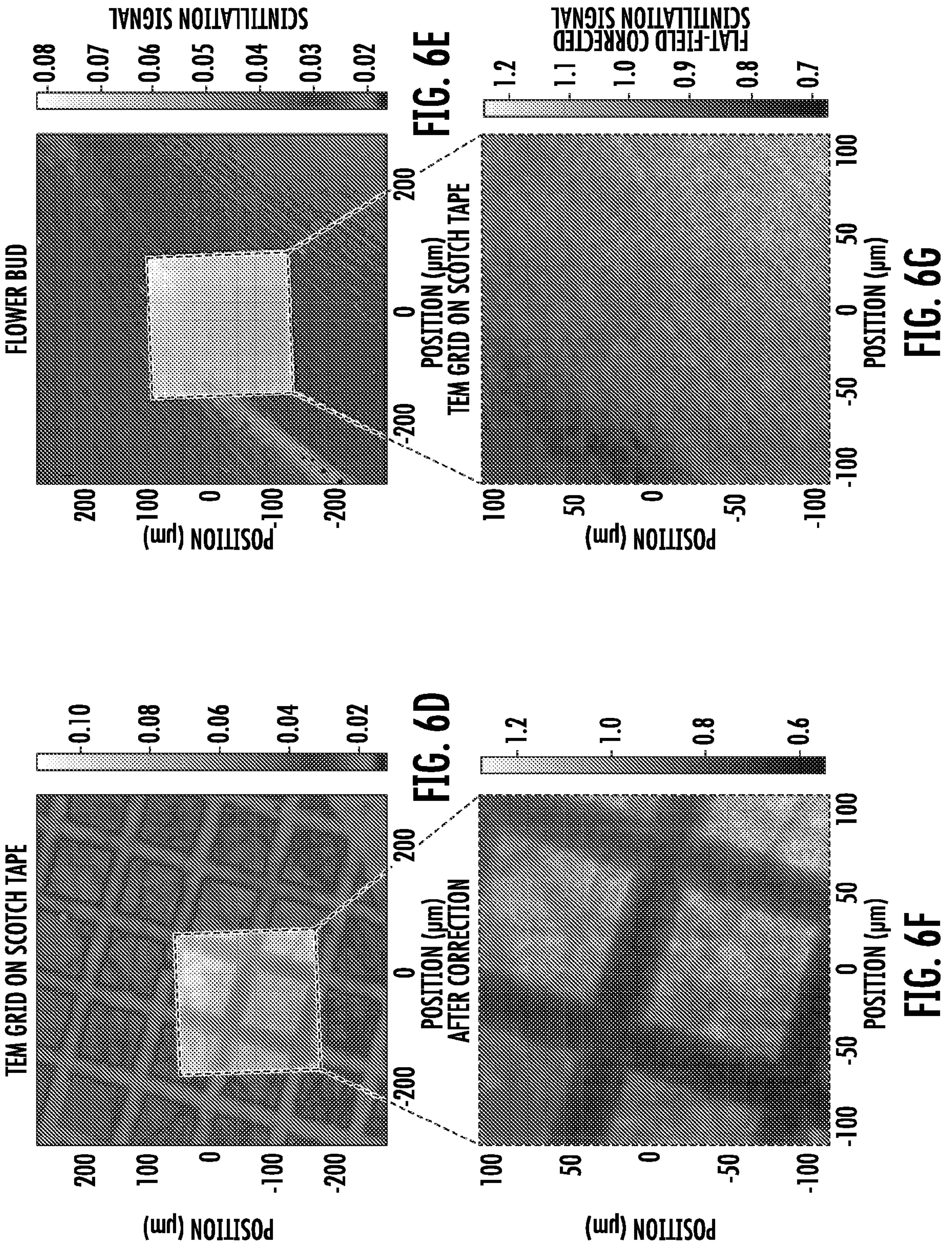
FIG. 6D shows the measured X-ray images of a TEM grid.
FIG. 6E shows a zoom-in of FIG. 6D in the region with the photonic crystal.
FIG. 6F shows the measured X-ray images of a flower bud.
FIG. 6G shows a zoom-in of FIG. 6F in the region with the photonic crystal.

FIG. 6C shows the experimentally measured scintillation scanned along the line of a sample. The regions "off" indicate unpatterned regions of the YAG:Ce, while "on" indicates the PhC region. Here, the signal is enhanced on average by a factor of ~2.4 over the unpatterned region, consistently with the predictions of FIG. 6B, X-ray images were also recorded through the PhC, showing no evident decrease in resolution, while increasing the image brightness by the same factor (or, equivalently, reducing the required X-ray dose or exposure time to get a given amount of counts on the detector). In the recorded X-ray images of biological and inorganic specimens shown in FIGS. 6D-6G, different patterns were observed matching the surrounding image from the bare scintillation image, demonstrating the ability of nanopatterned scintillators to capture high-resolution X-ray scans of various types of specimens. FIG. 6D shows a measured X-ray of a TEM grid. The lighter area is the section that contains the PhC. FIG. 6F shows a magnified view of the PhC region. FIG. 6E shows a measured X-ray of a flower bud. Again, the lighter area is the section that contains the PhC. FIG. 6G shows a magnified view of the PhC region. The magnification of FIGS. 6F-6G as compared to FIGS. 6D-6D is roughly 2.

Although the sample is quite thick compared to the wavelength of light, and the etch is quite shallow compared to the thickness, such enhancement of scintillation is still possible. In this case, the enhancement comes not from the local density of states but from outcoupling enhancement (or by reciprocity, in-coupling enhancement). Put differently, this enhancement arises from the fact that the PhC allows more channels (i.e. a plane-wave coupling to a resonance) to couple into the scintillator crystal, as compared to a flat interface. This effect is of the type often leveraged to design more efficient LEDs and solar cells (related to the so-called Yablonovitch limit in both ray-optical settings. In particular, in those settings, it is well known that the efficiency of an LED emission is optimized by designing a structure that leads to strong absorption over the spectral range of the emission.

This framework allows further understanding in the scintillation mechanism at play, directly leveraging known techniques in absorption enhancement in ray-optics and nanophotonics. Compared to theoretical upper bounds on absorption enhancement, the observed scintillation enhancement is mostly limited by longitudinal absorption losses, as an increase in scintillation enhancement of ~1.6 was observed by reducing the scintillator thickness from 100 to 50 μm. Beyond this limitation (which would disappear for thinner samples or materials with a smaller absorption coefficient), one could expect scintillation enhancements on the order of ~$4n^2$ in the ray-optics approximation or $4\pi n^2$ for periodic structures on the wavelength scale. For a high-index material such as doped GaAs, which also scintillates at room temperature, enhancements on the order of ~50 and ~150 could be achieved, respectively. For higher index materials, even higher enhancements might be possible.

Photonic crystal coatings on thick scintillators have been proposed to enhance the scintillation outcoupling efficiency, with some results showing enhancement of the emission. Our general theoretical framework, in conjunction with the corresponding experiment shown in FIG. 6A, sheds a new light on these previous designs, and gives a route to achieving optimal scintillation enhancements with similarly thick but also thinner patterned scintillator films. Beyond that, the experimental results demonstrate for the first time the potential of such nanophotonic scintillators for X-ray imaging.

FIGS. 7A-7E show several configurations that utilize "solar-cell" scintillators for high-resolution X-ray imaging. In each of these configurations, a HEP source 1 illuminates a specimen 2 to image. The X-ray absorption map through the specimen 2 creates a scintillation pattern in the scintillator 3. The scintillator pattern is imaged (usually at one of the surfaces of scintillator) with a set of free space imaging optics 4 (objective, filters, polarization optics, all optional) and a detector 5 (CCD camera, photomultiplier tube, photodiode array, etc.).

Figure 7A:
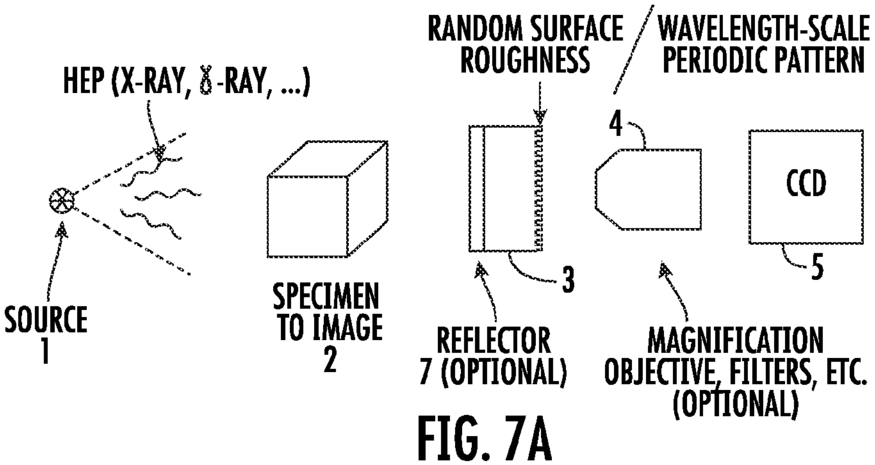
FIGS. 7A-7E show various configurations of a measurement system including a nanophotonic scintillator.

Single-shot X-ray scans from nanophotonic scintillators can be recorded with a measurement configuration such as the one shown in FIG. 7A. The HEP from an HEP source 1 traverse a specimen 2, resulting in a magnified HEP absorption map, transforming into a scintillating pattern at the surface of a nanophotonic scintillator screen. The scintillator surface is imaged with imaging optics 4, which comprises a set of some of the following items: imaging objective, color filters, polarization optics, and a detection device 5 (CCD camera, photodiode, photodetector array, etc.).

In the configuration shown in FIG. 7A, the patterned surface is facing toward the imaging optics 4. In all of these embodiments, the patterned surface may be either random roughness or a wavelength scale period pattern. The use of a reflector 7 on the back surface is optional. In this embodiment, the reflector is thin enough so as to be nearly transparent to the HEP.

Figure 7B:
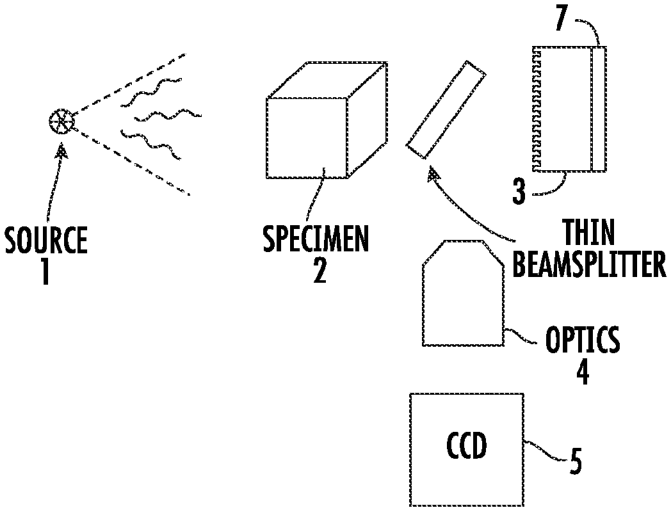

In the configuration shown in FIG. 7B, a beam splitter 6 is added in the optical path before the scintillator 3. A reflector is used on the facet that is farther away from the X-ray source. The patterned surface is facing toward the beam splitter 6. The beam splitter 6 should be thin enough, in order not to reduce the imaging resolution (typically, it should be thinner than the scintillator 3, or made of a very light material that does not absorb or scatter HEP significantly). This configuration may be used to mitigate background scintillation from thick optics (such as the imaging objective). The optics may be disposed at a 90° angle from the HEP beam.

Figure 7C:
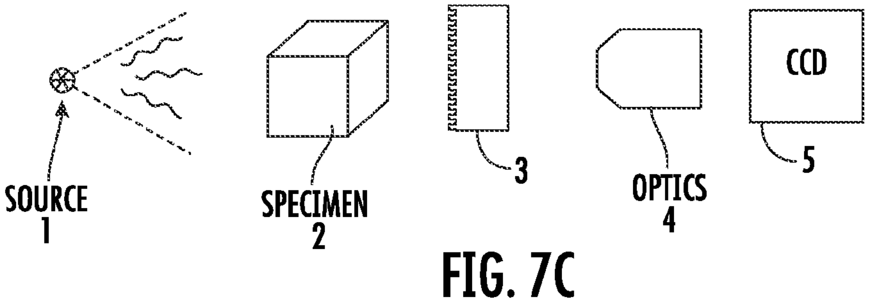

In the configuration shown in FIG. 7C the patterned surface is facing toward the HEP source. A reflector may not be used in this configuration.

Figure 7D:
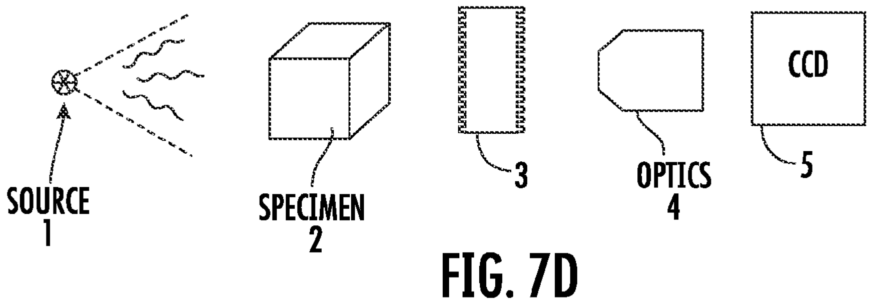

In the configuration shown in FIG. 7D, both surfaces of the scintillator are patterned.

Figure 7E:
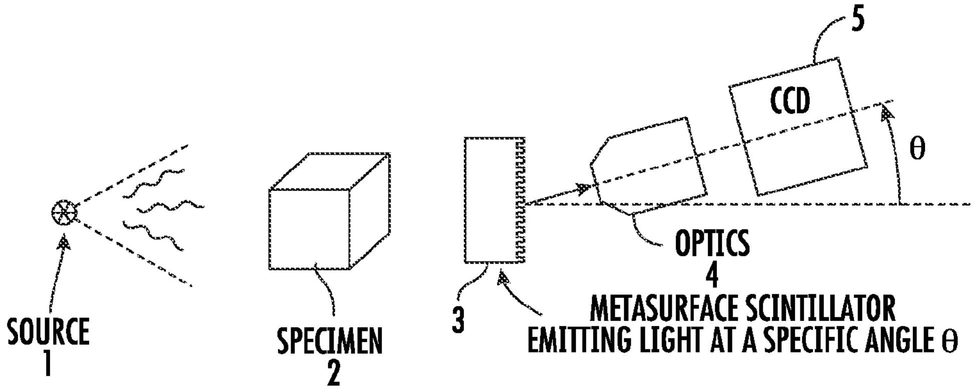

In the configuration shown in FIG. 7E, the nanophotonic scintillator is designed, according to techniques presented in the next sections, in order to deflect light at a given angle (θ). This configuration is similar to that of FIG. 7A, except the imaging optics 4 is rotated by that same angle with respect to a point at the center of the surface of the scintillator 3 facing toward the imaging optics 4. This configuration may be used to mitigate background scintillation from thick optics (such as the imaging objective).

Note that any of the scintillating devices described above, such as those shown in FIGS. 1C-1F and 2C-2F, may be utilized as the scintillating device in the embodiments shown in FIGS. 7A-7E.

More generally, since the equivalence between optimizing scintillation and absorption in nanophotonic structures has been shown, any strategies to enhance absorption can be used to design enhanced scintillators. Another such strategy is to use angular-selective structures coupled with "solar cell" scintillator designs.

Figure 8A:
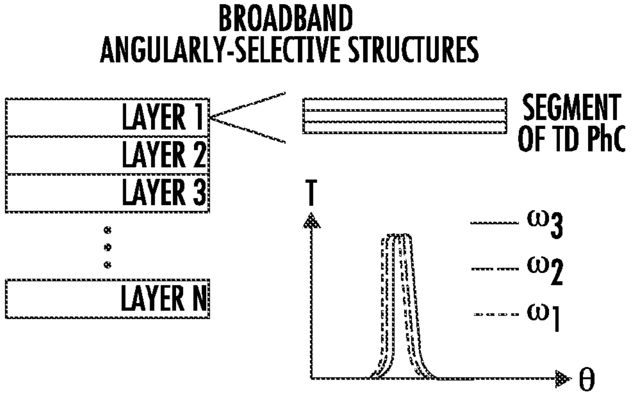
FIG. 8A shows a broadband angular selective nanophotonic scintillator.
Figure 8B:
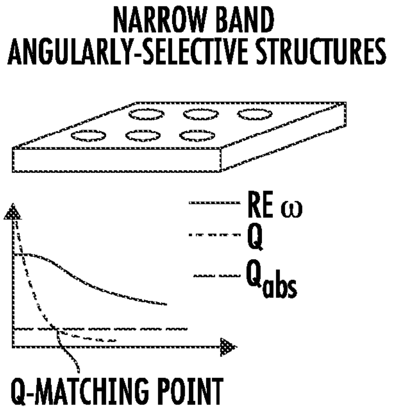
FIG. 8B shows a narrowband angular selective nanophotonic scintillator.

Angularly-selective structures allow light over a broad range of frequencies to be selectively transmitted over a small range of angles. For example, such structures, by making use of a stack of photonic crystals which preserves the Brewster angle over a large frequency range, enable transmission over a small range of angles 40. Scintillators in which one or more layers is an "angularly-selective" structure which transmits light incident only over a narrow range of angles. It may either be broadband, as shown in FIG. 8A, or narrowband, as shown in FIG. 8B, with respect to frequencies of operation.

Figure 8C:
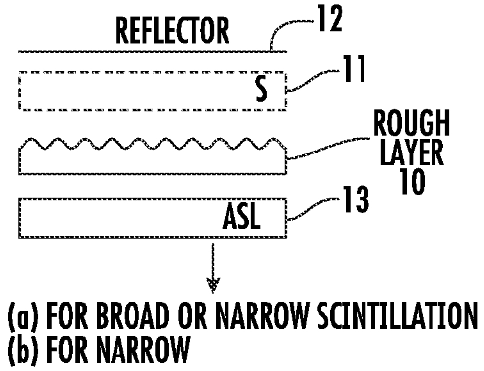
FIG. 8C shows an angular selective nanophotonic scintillator structure.

To use this to enhance scintillation, consider the system shown in FIG. 8C: a rough surface 10 which strongly scatters light is placed near a scintillating material 11. Alternatively, the scintillator 11 has a rough, or even ordered (PhC) pattern etched into it, similar to the techniques used in FIGS. 2C-2F. The structure is surrounded by a reflector 12 (to block light from exiting on one side), and an angularly selective layer (ASL) 13.

Figure 8D:
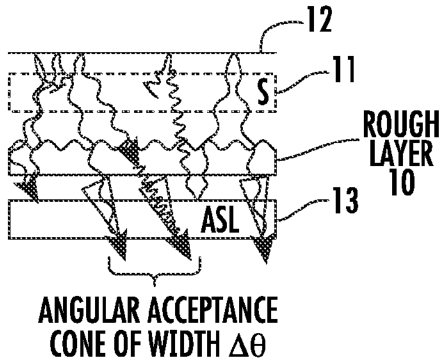
FIG. 8D shows the principle of operation of the scintillator of FIG. 8C.

To see the effect of this structure, consider light isotropically emitted by a scintillating center in the scintillator as shown in FIG. 8D. Light which does not impinge upon the angularly selective structure within some angular range of width $\Delta\theta$ will be reflected and multiply scattered until it does enter at the correct angular range, under which case it will transmit. The expected enhancement is roughly $4n^2/\Delta\theta^2$ for small $\Delta\theta$, leading to large absorption enhancements. Thus, an emitter which scintillates at all angles will have light in the angular acceptance range of the ASL 13 transmit directly. Light which is filtered will undergo multiple scattering until it transmits, leading to all light being emitted in a narrow angular range.

In certain embodiments, the angular concentration, which is defined as the amount of light exiting at a certain angular range of width $\Delta\theta$ to the total amount of light exiting the scintillating device, is enhanced by a factor of 5, 10, 20, 50, 100, 500, 1000, 5000, 10000, 50000, or more.

Other possible geometric arrangements are shown in FIGS. 8A-8C.

Such angularly selective structures lend themselves well to scintillation enhancement over a broad frequency band. For enhancement over a narrow frequency band, it is possible to use resonant structures with high-Q resonances for a particular angle of propagation which, under conditions of critical coupling lead to high transmission over some narrow angular range. Critical coupling may be defined as the radiative and absorptive Q of the structure are the same. These structures could be used in place of broadband angularly selective structures if only a narrow frequency range of scintillation needs to be enhanced, such as the scintillation emitted from defect centers.

Another possibility arising from resonant structures is as follows. Under conditions of high transmission, a large circulating power builds up in the resonator, leading to large absorption enhancement. From the theory of the previous sections, if the scintillating material is instead integrated into the angularly-resonant structure, there will be a large enhancement of absorption over this range of angles, and correspondingly, of scintillation.

Metasurface Scintillators with Tailored Spectral, Angular, and Polarization Properties This framework for describing scintillation in nanophotonics also allows the design of nanophotonic scintillators with tailored angular, spectral, and polarization properties. In this section, several different applications and embodiments of the proposed devices are described. First, a description of how this framework can be used to design such devices is disclosed.

Figure 9A:
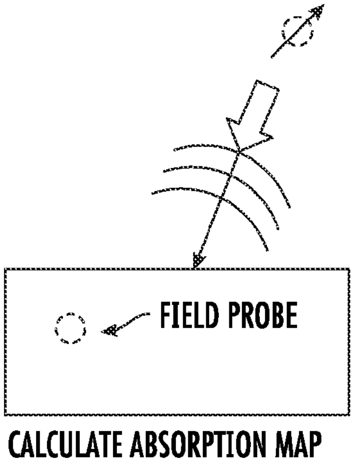
FIGS. 9A-9B show scintillator metasurfaces.
Figure 9B:
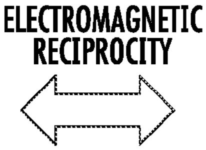
Figure 9B:
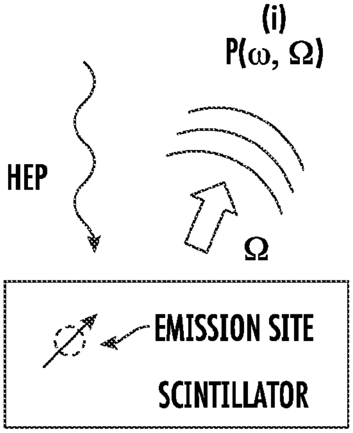
Figure 9C:
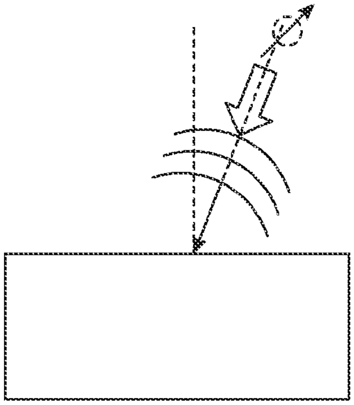
FIGS. 9C-9D show scintillator deflectors.

FIGS. 9A-9B show how absorption and scintillation can be mapped. Calculating absorption from dipoles located outside the scintillator, which is shown in FIG. 9A, is equivalent, via electromagnetic reciprocity, to calculating scintillation power, emitted upon bombardment by a HEP, with frequency, emission direction, and polarization, as shown in FIG. 9B, defined by the dipole from FIG. 9A.

Figure 9D:
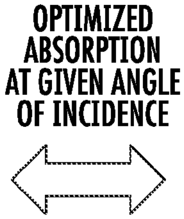
Figure 9D:
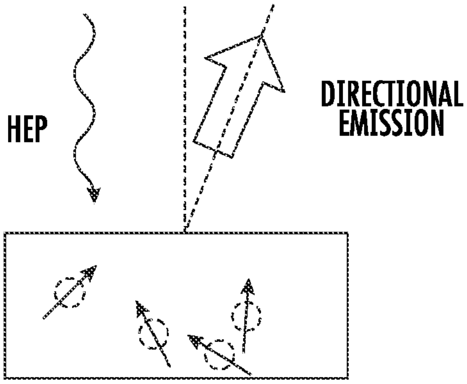

This principle can be utilized to design nanophotonic scintillators emitting mostly in one designed direction, which are devices analogous to diffraction gratings. To achieve this functionality, an optimized absorber at a given angle of incidence must be designed. This can be achieved with optimization methods, such as inverse-design (e.g. topology optimization, unit-cell based optimization, or surrogate methods), or direct design using techniques known in the field of solar cells. When bombarded by a beam of HEP, as shown in FIG. 9D, the structure will mostly scintillate towards the direction of interest. In other words, a scintillator deflector is optimized to absorb light coming at a given angle of incidence. Reciprocally, when bombarded by a beam of HEP, the scintillator mostly emits in the designed direction.

This type of device may find applications in unconventional detection settings, such as the one shown in FIG. 7E. More generally, directional scintillation is of interest in reducing "bleeding" from light diffraction and in increasing scintillation imaging resolution.

Figure 9E:
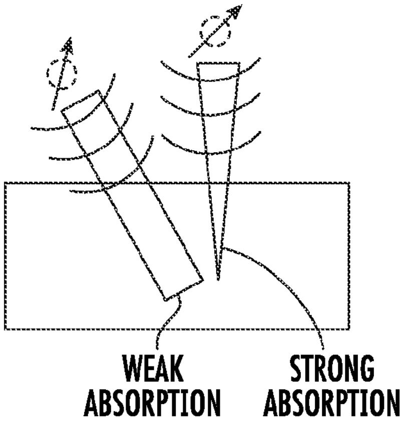
FIGS. 9E-9F show scintillator lenses.

Similarly, a nanophotonic scintillator can be optimized to emit scintillation waves that constructively interfere to focus at a given point in the far field. This is achieved with the technique shown in FIGS. 9E-9F. The nanophotonic structure shown in FIG. 9E is optimized to mostly absorb light from a dipole located at a given location in the far-field. Absorption from other locations is minimized at the same time. Such designs can be achieved with already-known techniques in the field of metasurface imaging from coherent and incoherent sources. Via electromagnetic reciprocity, the behavior of this "scintillator lens" can be predicted, when bombarded by a beam of HEP. The induced distribution of emitted dipoles will coherently emit to focus light at the location of the dipole with optimized absorption from FIG. 9F. In other words, a scintillator lens is optimized to absorb light from a dipole located at a given location in the far field. Reciprocally, when bombarded by a beam of HEP, the scintillator mostly focuses light at the original dipole location.

Figure 9F:
Figure 9F:
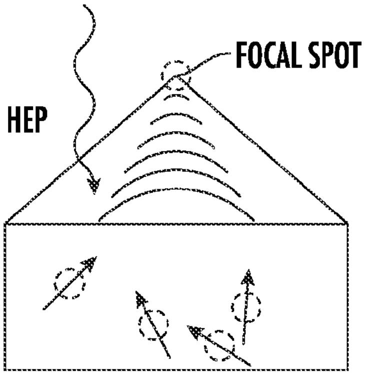

Conversely, one can directly utilize the approach comprising modeling scintillation from a collection of incoherent dipoles deposited in the scintillator by the HEP beam, as shown in FIG. 9F. This approach can be used to guide the design of a nanophotonic scintillator concentrating light at a given location. More specifically, a resonant mode of the structure may be designed with the following properties:

The mode should be extended along the transverse direction (parallel to the surface of the scintillator); and The mode's near-field at the surface of the scintillator should have the phase profile of a focusing lens.

In this way, incoherent dipoles in the scintillator will excite the coherent mode of the structure, with adequate phase profile so that the contribution of the dipoles will add up coherently to be concentrated/focused at the design position.

In certain embodiments, the scintillation concentration at the focal spot is enhanced by a factor of 5, 10, 20, 50, 100, 500, 1000, 5000, 10000, 50000, or more. with respect to an unpatterned structure.

These concepts can be applied directly to generating nanophotonic scintillators with tailored spectral, directivity, or polarization properties.

Thus, FIGS. 9A-9F utilize a second technique that may be used in the creation of scintillators. The second technique comprises integrating scintillators with nanophotonic structures in order to control their spectral, angular, and/or polarization properties. The resulting devices may be used for novel imaging modalities, or to realize more compact scintillator systems.

End-to-End Inverse-Designed Nanophotonic Scintillators for Detection, Imaging, and Spectroscopy of HEP In this section, means to design nanophotonic scintillators for detection, imaging, and spectroscopy of HEP in conjunction with optimized reconstruction algorithms are disclosed. This combination allows reconstruction of information on the HEP bombarding the structure, such as their spatial and spectral distribution. This information can be further utilized to perform three-dimensional (3D) reconstruction of the imaged specimen with greater accuracy and compact form factors while using fewer scans or smaller dosage of ionizing radiations.

Thus, a third class of devices comprises "end-to-end" scintillator devices, which are co-designed (or optimized) alongside reconstruction algorithms. More specifically, the scintillator geometry and material properties are designed (or optimized) in conjunction with hyperparameters of a given reconstruction algorithm, tailored to optimally realize detection, imaging, or spectroscopic modalities.

Figure 10:
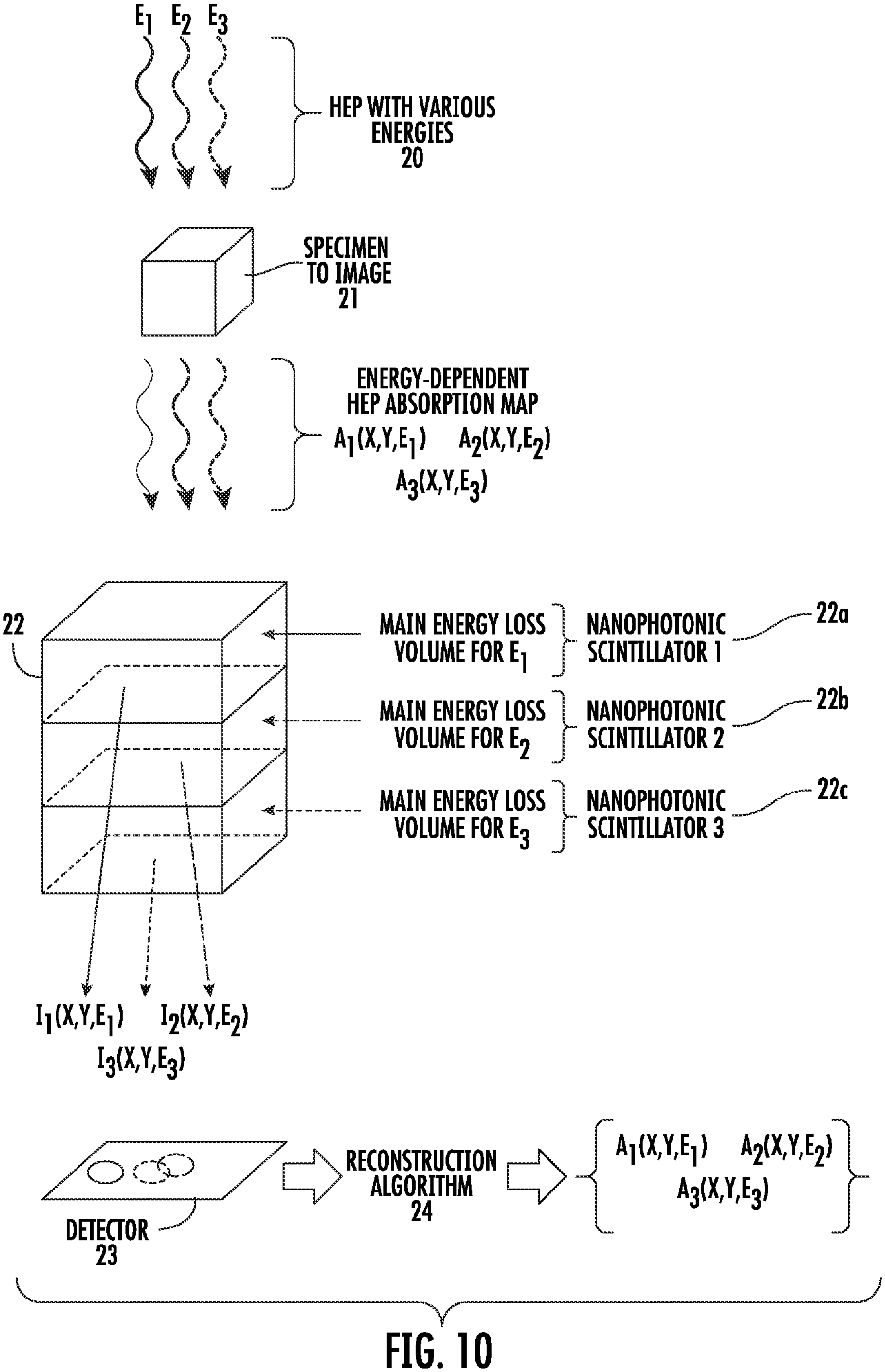
FIG. 10 shows a nanophotonic scintillator spectroscopic device.

In FIG. 10, an intuitive example of how a HEP spectroscopic nanophotonic scintillator can be designed using multiplexing of scintillation from HEP with different energies is presented. A beam of HEP 20 with different energies $E_1<E_2<E_3$ passes through a specimen 21 is incident on a nanophotonic structure 22. Different energies will result in different energy loss distributions (typically, larger energies will penetrate deeper in the surrounding material). Thus, the nanophotonic environment different energy loss distributions can be designed such that different scintillation from energies will have different direction, frequency, or polarization $\{\omega_j, \Omega_j, i_j\}$ of emission. Naively, this can be realized by separating the structure into three different sub-structures 22*a*, 22*b*, 22*c*, which mostly overlap with a given energy loss distribution. Doing so, scintillation from HEP 20 with energy $E_j$ will be emitted with characteristic frequency, direction, and polarization $\{\omega_j, \Omega_j, i_j\}$. In the ideal case where the energy loss distributions have no overlap, and the emission of each sub-structure is purely along the designed $\{\omega_j, \Omega_j, i_j\}$, the spectroscopic reconstruction is trivial (the amount of light emitted at each $\{\omega j, \Omega_j, i_j\}$ can be mapped to energy loss from HEP with energy $E_j$, and thus from the spectroscopic weight of energy $E_j$ in the total spectrum. Using a set of optics and a detector, the pattern formed on the detector 23 can be used to reconstruct the original spectrum of the HEP beam.

In the more general case, where the multiplexing is not ideal, reconstruction algorithms 24, such as least square error, Tikhonov regularization, or LASSO regularization may be utilized to increase the robustness of the reconstruction method.

Typically, the normalized $L_2$-norm of the difference between the reconstructed and the real energy distribution is used to characterize the accuracy of the reconstruction method:

$$Err = \|E - E'\|_2 / \|E\|_2$$

where E is the real spectrum, E' the reconstructed one, and $\|.\|_2$ the $L_2$-norm More generally, given a reconstruction method with trainable hyperparameters, the nanophotonic structure's geometry and material parameters may be optimized in conjunction with those hyperparameters to achieve optimal reconstruction. Such "end-to-end" approaches have been utilized in the context of nanophotonic imaging and polarimetry.

In certain embodiments, the scintillating device 22 is selected such that spectroscopic reconstruction can be achieved with an error of less than 50, 20, 10, 5, 1, 0.1, or 0.01%.

Figure 11A:
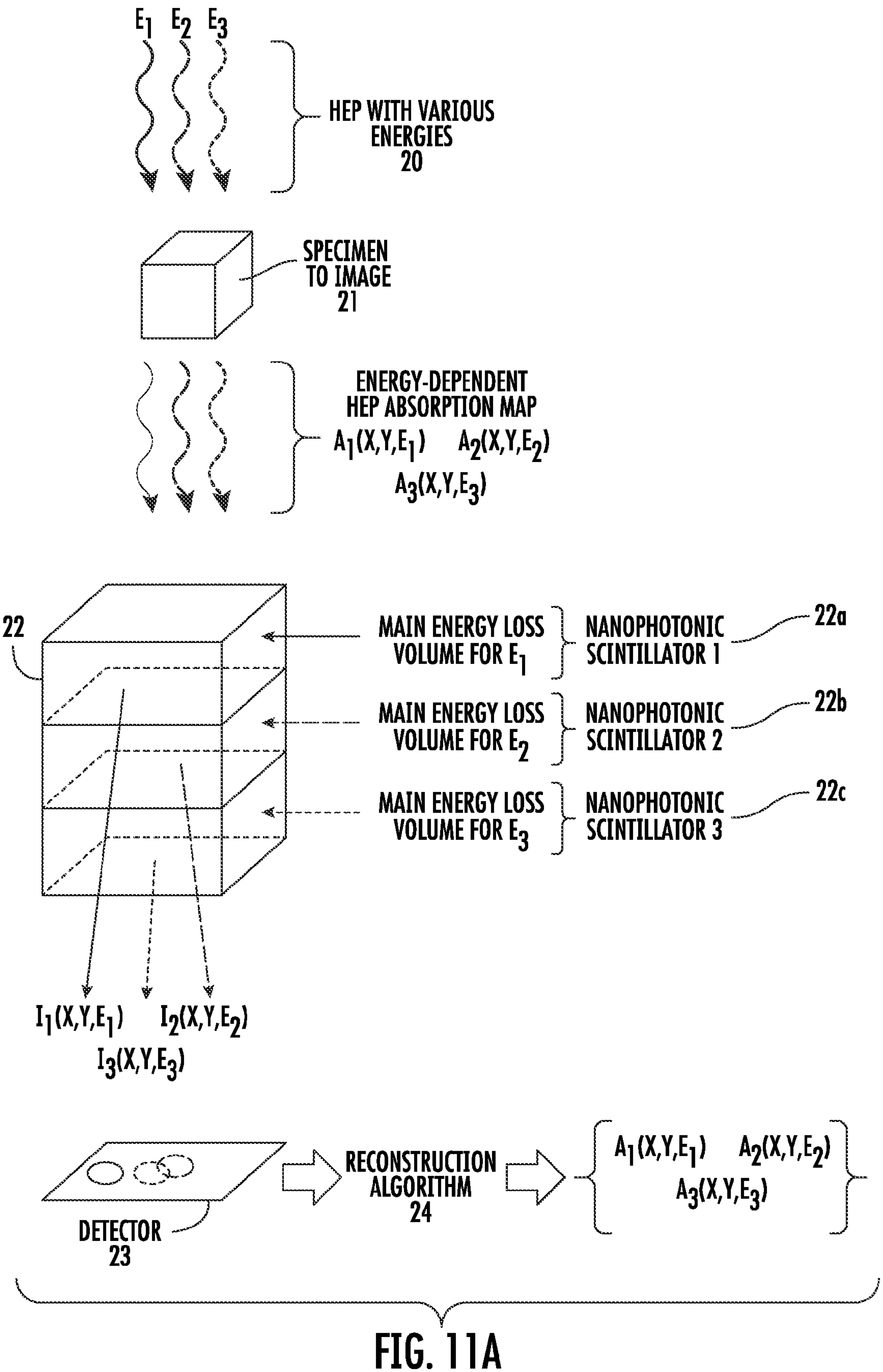
FIG. 11A shows a nanophotonic scintillator energy resolved imaging device.

FIG. 11A shows how such structures can be also utilized for scintillation spectroscopic imaging, realizing a scintillation camera with spectroscopic capabilities, which could also be referred to as a hyperspectral scintillation camera. Naively, one can use a setup and a structure similar to that of FIG. 10, but adding a specimen in the path of the HEP beam with different energies. The original HEP spectrum may be known as it may have been measured with a technique such as the one in FIG. 10, or with other conventional techniques. The HEP absorption map going through the structure will be energy-dependent, resulting in a spatial-energy-dependent absorption map $A(x,y,E_j)$.

Similar to the situation shown in FIG. 10, different energies will result in different energy loss distributions. Assume again that higher energies penetrate deeper in the structure. Then, utilizing multiplexing techniques similar to that of FIG. 10, scintillation patterns from different energies $I(x,y,E_j)$ may be multiplexed in different characteristic frequency, direction, and/or polarizations $\{\omega_j,\Omega_j,i_j\}$. Using tailored algorithms, the original absorption maps can be reconstructed in 3D: two spatial dimensions (x,y) and one energy dimension $E_j$. Similar to FIG. 10, the nanophotonic scintillator may be optimized in an end-to-end fashion, in conjunction with hyperparameters from the reconstruction algorithms. By using this $(x,y,E_j)$ 3D information, 3D spatial information (x,y,z) on the specimen to image may be deduced, using information on the energy-penetration depth dependence. End-to-end inverse design forces the nanophotonic structure to intimately adapt to the reconstruction backend, leading to richer imaging data that can be acquired with fewer scans (or even a single exposure to HEP), enabling greater speed and accuracy in reconstruction. More specifically, the framework could be adapted to directly identifying and detecting specific patterns in the reconstructed image, such as tumors, fractures, defects and other patterns.

In certain embodiments, the scintillating device 22 is selected such that spectroscopic absorption map reconstruction can be achieved with an error of less than 50, 20, 10, 5, 1, 0.1, or 0.01%.

Figure 11B:
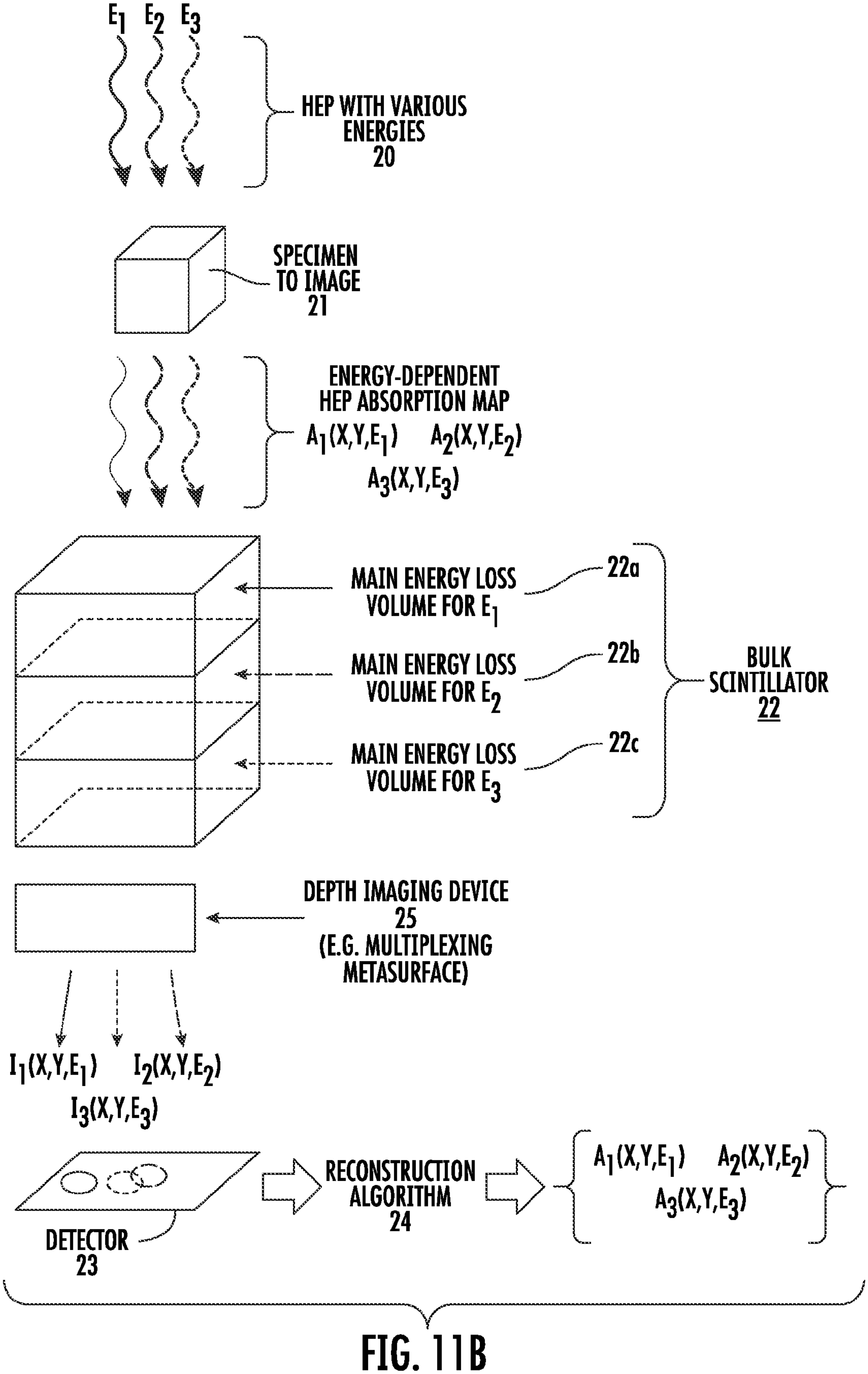
FIG. 11B shows a nanophotonic scintillator energy with a depth imaging device.

Another method to reconstruct depth-dependent images from scintillators, which does not involve the patterning of the scintillator itself is disclosed. In this embodiment, as shown in FIG. 11B, a depth imaging device 25 is placed after the scintillator 22 to reconstruct images from different depths. This depth imaging device 25 may be a light field camera, or a translating imaging objective coupled to a detector, or a designed nanophotonic structure that can multiplex emitted light from different depths. Depth-dependent information is then obtained, which originates from different distributions of energies. This results in a spatially-energy-resolved scintillation pattern, which can be used to extract cross-correlated information from different irradiation energies.

The concepts proposed in the previous section are generalizable to larger discrete set of energies and continuous spectra of incident HEP energies.

Application to Compressed Sensing in Medical Imaging

One set of possibilities for the reconstruction backend are compressed sensing (CS) algorithms. CS performs accurate reconstruction when the imaging problem satisfies sparsity and incoherence conditions. Consider a more general example of HEP imaging in FIG. 12, similar to the configuration in FIG. 6A. As with the example in FIG. 11A, the spatial-energy-dependent absorption map is represented as $A(x,y,E_j)$. $(x,y,E_j)$ is referred to as the "natural domain" so $A(x,y,E_j)$ is the representation of A in the natural domain.

The sparsity condition for CS requires that there exists a transform domain for which the representation of A is sparse. Examples for sparsifying transforms 30 include the Fourier transform, finite-difference transform, and wavelet transform. Alternatively, new transforms may be learned from specific ensembles of specimens. $\Psi$ is defined so that its adjoint operator $\Psi^{\dagger}$ is the orthogonal sparsifying transform that takes A from the natural domain to the transform domain. The column vectors of $\Psi$ form an orthogonal basis for the natural domain. From the HEP absorption map, the intensities of HEP incident on the nanophotonic scintillator can be determined. The scintillator 3 then emits near visible or visible light that gets picked up by a detector 5. The incoherence condition for CS requires that the vectors of the detection basis $\Phi$ are incoherent with those of the sparse basis $\Psi$. For instance, the sparse transform 30 may take the discrete derivative of the image along different directions, which effectively nullifies uniform areas and creates a large (positive or negative) value at boundaries or edges between two such uniform areas. Thus, the transform may be an edge detection function.

End-to-end optimization provides a way to pattern the nanophotonic scintillator so that the far field pattern (or detection domain representation) is incoherent with the sparse transform domain and therefore compatible with CS reconstruction algorithms. Compressed sensing reconstruction can then be used to find $A(x,y,E_j)$, which in turn allows the extraction of some of the 3D (x,y,z) information.

One key assumption to perform reconstruction of the original absorption maps $A(x,y,E_j)$ is the linearity of the relation between the pattern $I(x, y, E_j)$ and the absorption maps $A(x,y,E_j)$. This can be realized by assuming that the scintillator 3 is pumped by low-power beams. In particular, the following relationship may be assumed:

$$EL(x, y, z) = \sum_j A'(x, y, E_j)\exp(-z/\lambda_j)$$

where EL(x,y,z) is the spatially-dependent energy deposited in the scintillator, A'(x,y,z) is the input absorption map at the scintillator surface (facing the source, the difference between A and A' being accounted for by geometrical magnification), and $\lambda_j$ is the characteristic penetration depth of HEP with energy $E_j$ in the scintillator. Diffusion of excited states of matter is also neglected (as can be the case in scintillators where scintillation comes from dopants or semiconductors with low mobility). Lastly, any nonlinear process through which the bombardment of HEP modifies the permittivity of the scintillator are neglected.

The energy loss distribution EL(x,y,z) typically acts as incoherent sources for the Maxwell equations in the visible image formation process, in which case the reconstruction problem is linear and classical CS algorithms can be employed. However, if the energy deposited in the scintillator modifies the dielectric environment (at high pump powers, e.g. with focused HEP beams), the Maxwell equations must be solved for the perturbed dielectric profile, leading to a more challenging nonlinear reconstruction problem. A wide variety of techniques from the field of refractive index tomography can be employed, taking into account multiple scattering effects at varying levels of complexity within the reconstruction process. More conventional techniques in CS, such as iterative solvers (FISTA) and neural networks models (LISTA) may be used as well.

Neural networks, more generally, such as Convolutional Neural Network, may be used as scintillation signal processing backend. They may be used to classify signals from various energies, or to reconstruct and/or segment images. For neural networks, several parameters may be optimized in conjunction with the photonic structure parameters, such as: neural network weights and regularization hyperparameters.

Figure 12:
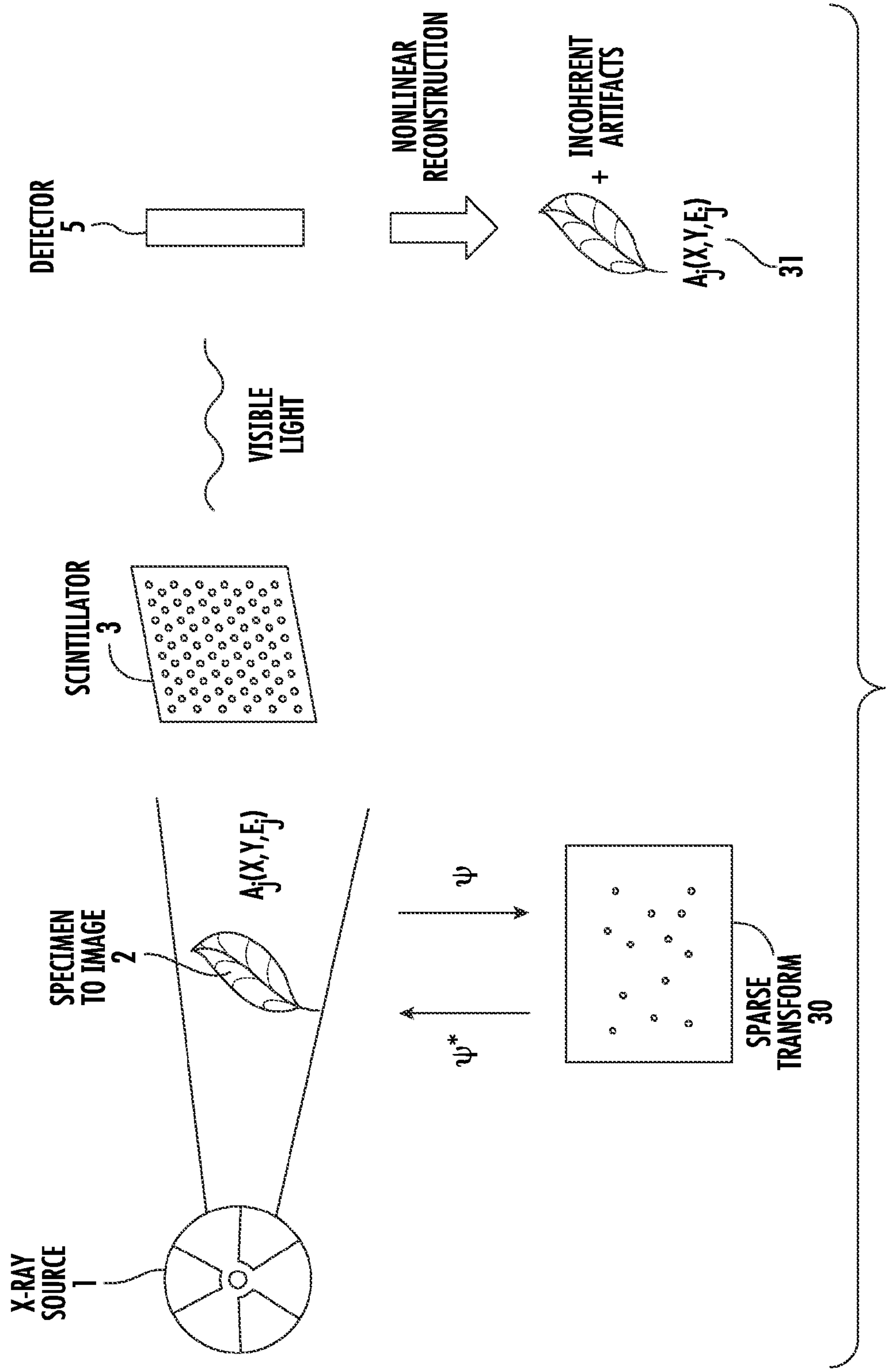
FIG. 12 shows scintillator imaging with compressed sensing.

FIG. 12 shows end-to-end nanophotonic imaging with compressed sensing reconstruction. A beam of HEP 1 impinges on a specimen 2. The resulting absorption spectrum has a sparse representation in some suitable transform domain. A detector 5 undersamples the resulting pattern. The transform domain and detection basis should be chosen so that undersampling artifacts 31 are incoherent in the transform domain. A nonlinear compressed sensing algorithm computes the nonzero elements in the sparse representation of the absorption spectrum and reconstructs the original image.

Nanophotonic Scintillators for Higher Spatial Resolution

Next a description is provided of how nanophotonic scintillators, as described in the previous sections of this disclosure, can enable detection of fine features (corresponding to high spatial resolution). A metric of interest to characterize nanophotonic scintillators is their detective quantum efficiency (DQE), a function of the spatial frequency k, and given by:

$$DQE(k) = \frac{1}{1 + \frac{1}{g_2 g_4 |MTF(k)|^2}}$$

where $g_2$ is the optical gain (in number of optical photons per incoming x-ray photons), $g_4$ the optical outcoupling efficiency, and MTF(k) the modulation transfer function, defined as the Fourier transform of the impulse response of the system. This formula applies to a broad range of optical systems integrating scintillators, such as flat panel detectors.

Figures 13A, 13B, 13C, 13D:
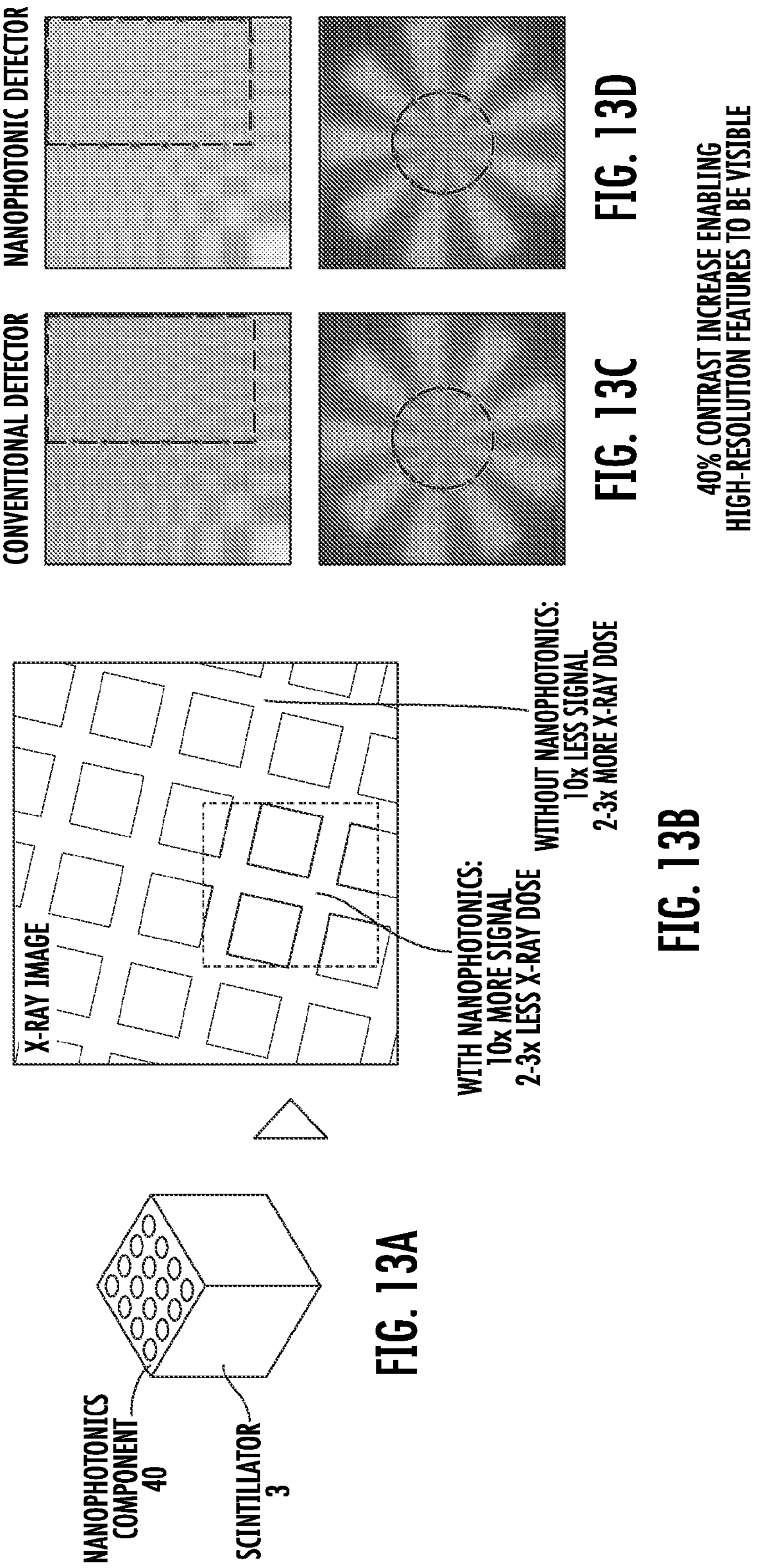
FIG. 13A shows a scintillator used for experiments.
FIG. 13B shows an X-ray image taken by the scintillator in FIG. 13A.
FIGS. 13C-13D show simulated images using a conventional detector and a nanophotonic detector, respectively.

In FIGS. 13A-C and 14, it can be seen how increasing $g_2g_4$ can result in greater DQE at high spatial frequencies, thereby enhancing the spatial resolution of the total system. The projected enhancement is calculated for a typical nanophotonic scintillator ("solar cell" scintillator as described in the previous sections) having an array of holes 40 on top of a bulk scintillator 3, as seen in FIG. 13A. FIG. 13A shows an experimental X-ray scan, showing a brighter area where the scintillator 3 is nanopatterned. FIG. 13C shows conventional scintillator performance, while FIG. 13D shows nanophotonic scintillator performance. A comparison of FIGS. 13C and 13D shows an increased signal-to-noise ratio for high spatial frequencies, allowing smaller feature sizes to be resolvable. In certain embodiments, there may be a 40% increase in contrast.

Figure 14:
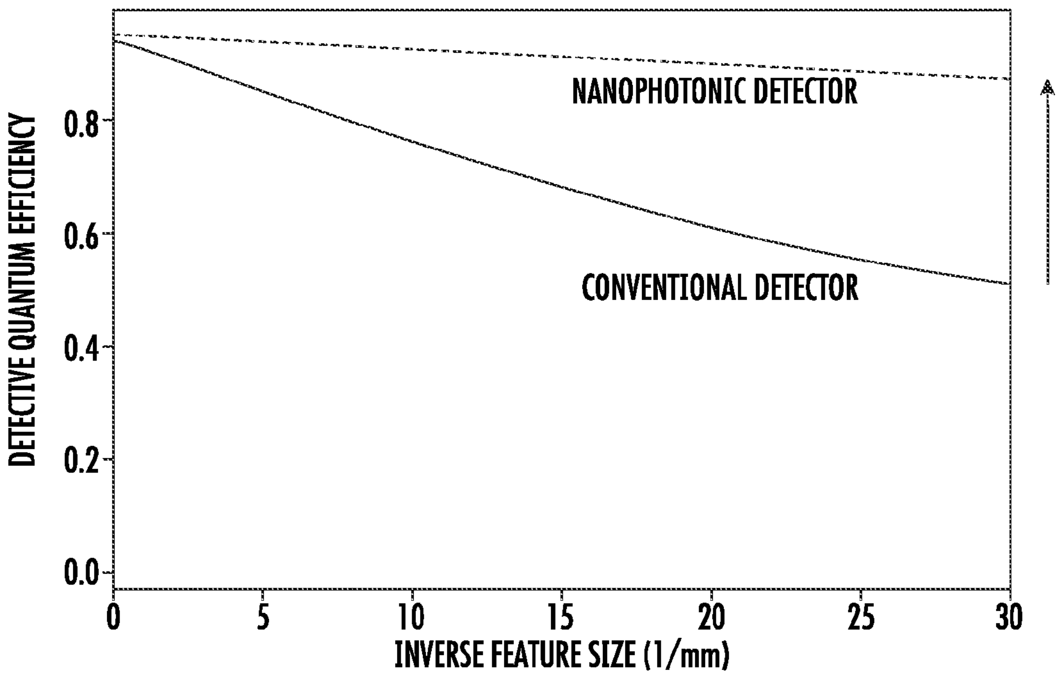
FIG. 14 shows the detective quantum efficiency of a scintillator and a nanophotonic scintillator.

FIG. 14 shows the calculated detective quantum efficiency (DQE) of a conventional vs. nanophotonic scintillator. The nanophotonic detector shows a two-fold increase in DQE at large spatial frequencies (30 lines per mm, corresponding to about 30 μm feature size).

Stacked Multi-Color Scintillator for Energy Resolution and Enhanced Contrast

Figure 15A:
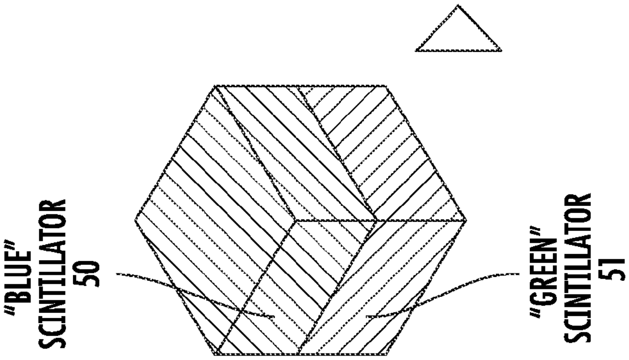
FIG. 15A shows a scintillator made up of stacked scintillators of different colors.
Figure 15B:
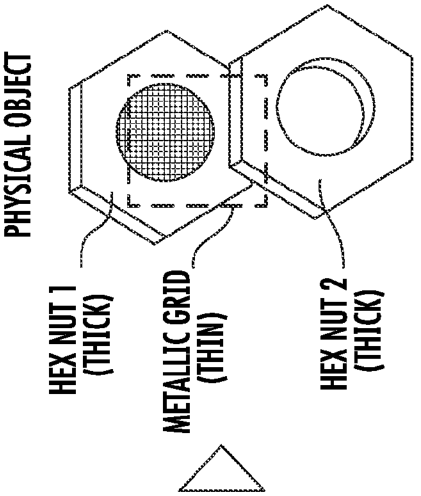
FIG. 15B shows an object to be scanned.
Figure 15C:
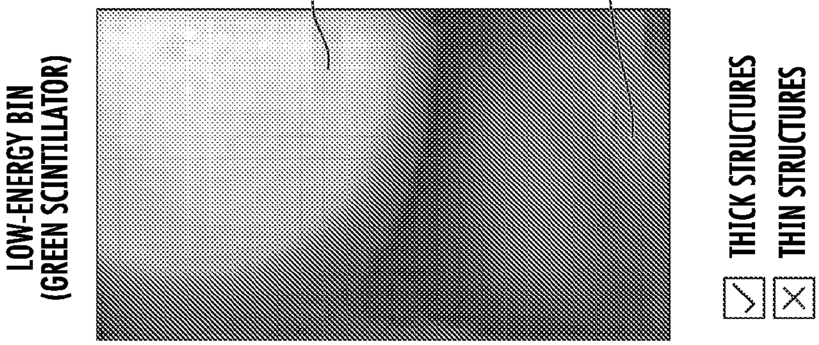
FIGS. 15C-15D show the images produced from each of the scintillators in FIG. 15A.
Figure 15D:
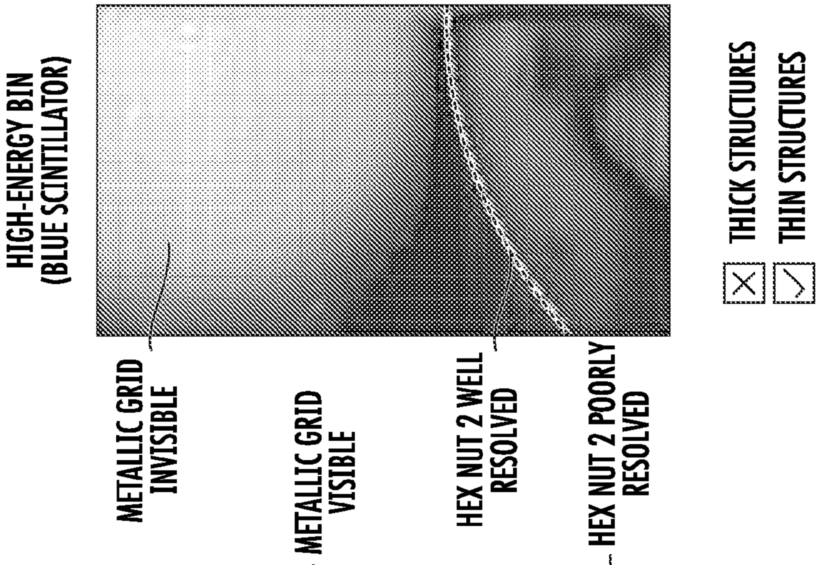

Next, a design of stacked scintillators emitting at different wavelengths is described. The scintillators are picked such that x-rays first go through lighter scintillators, and then through heavier scintillators. FIG. 15A shows an example scintillator. First, x-rays see the "green" scintillator 51, which absorbs efficiently lower-energy x-rays. Then, remaining x-rays, mostly at high energies, see the "blue" scintillator 50, which absorbs efficiently high-energy x-rays (due to its high density). In this way, a correlation is introduced between the emitted color and the x-ray energy. Scintillators may be selected such that the emitted wavelength decreases with layer number, such that the emitted light does not get reabsorbed by subsequent layers. Interlayer filters can also be used to increase contrast.

The performance of such a scintillator design was measured and the results are shown in FIGS. 15-18. FIG. 15B shows the physical object being X-ray scanned. The object is two hex nuts, wherein a metallic grid is disposed inside on the hex nuts. FIG. 15C shows the energy from the green scintillator 51, while FIG. 15D shows the energy from the blue scintillator 50. Note that the metallic grid is visible in the low energy bin (FIG. 15C), but not visible in the high energy bin (FIG. 15D). Additionally, the second hex nut is much better resolved in the high energy bin. In general, the low energy bin image shows overall better contrast, but poor contrast for thick structures. The high-energy bin exhibits better contrast for thicker structures.

Figure 16:
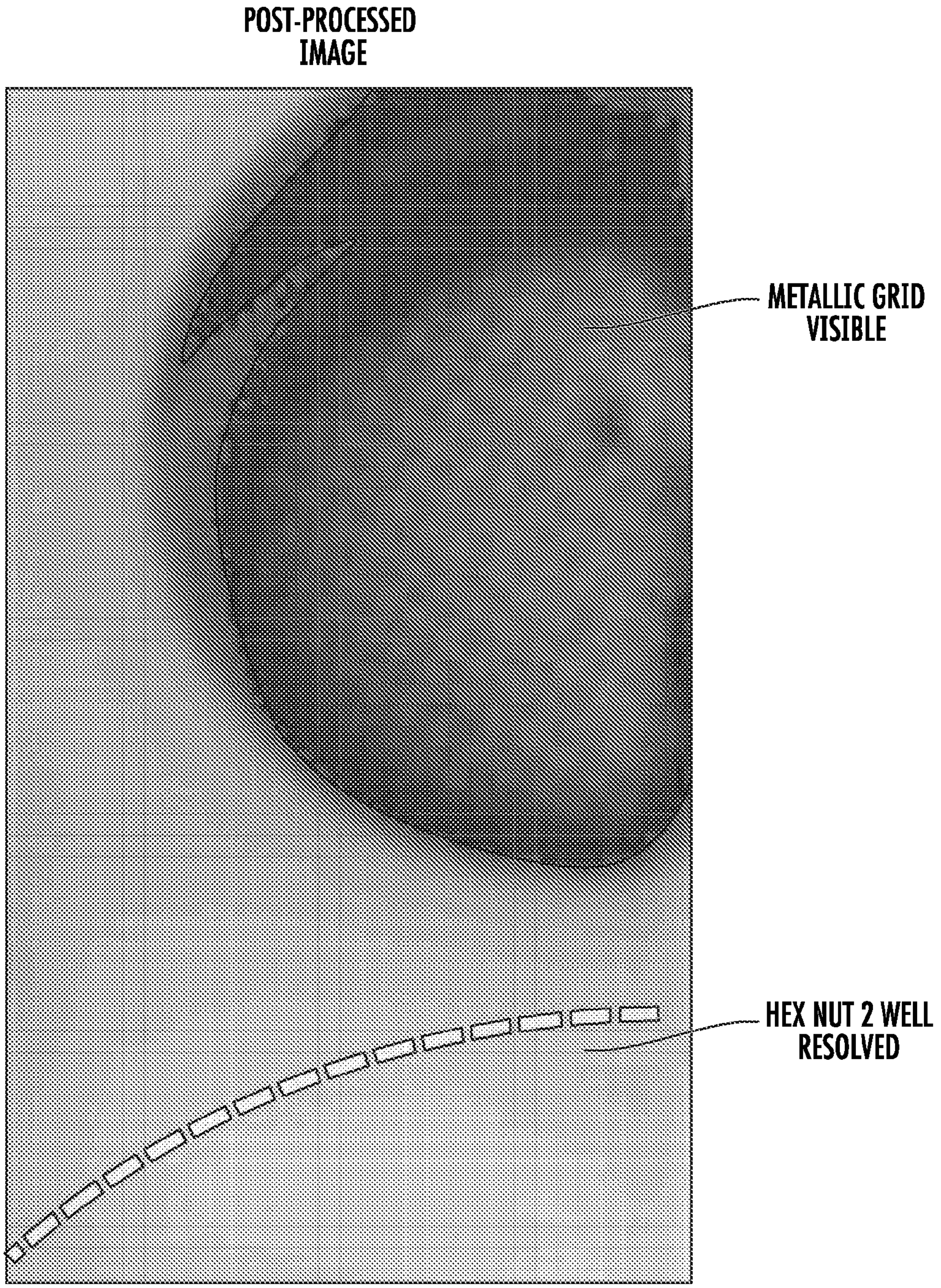
FIG. 16 shows a post-processed image based on the images in FIGS. 15C-15D.

FIG. 16 shows a post-processed image, corresponding to the weighted difference of the high and low energy bin images, clearly showing the metallic grid with high contrast on the top part of the image. Further, the second hex but is well resolved.

Figure 17A:
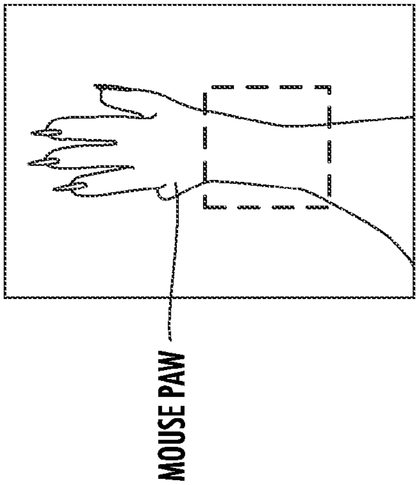
FIG. 17A shows an object to be scanned.
Figure 17B:
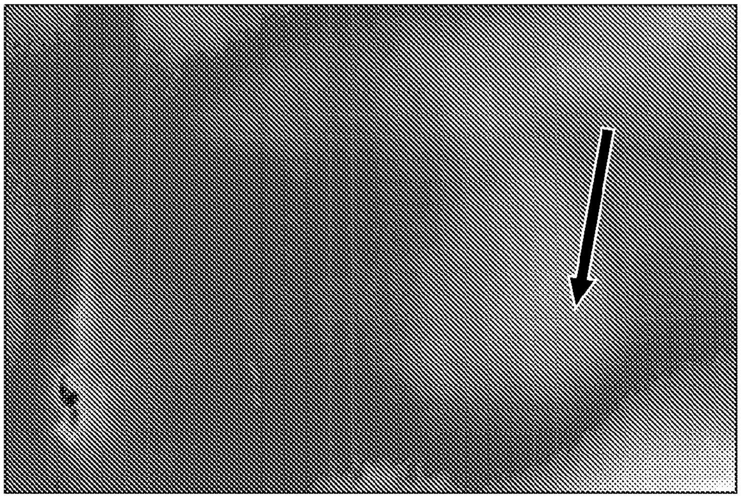
FIGS. 17B-17C show the images produced based on the object shown in FIG. 17*a* using each of the scintillators in FIG. 15A.
Figure 17C:
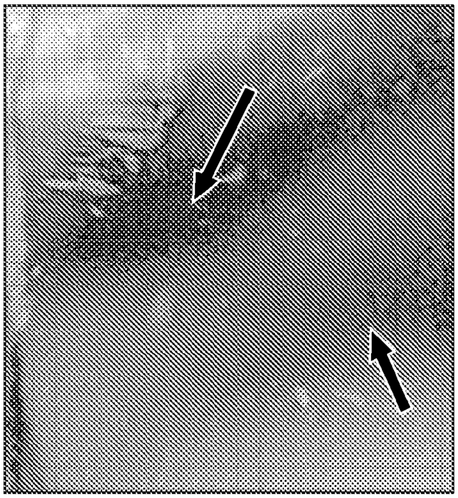

FIG. 17A shows an object to be scanned. FIG. 17B shows the low energy bin which results from the green scintillator 51. FIG. 17C shows the high energy bin which results from the blue scintillator 50. Again, as with FIGS. 15A-15D, the low energy bin image shows overall better contrast, but poor contrast for thick structures. The high-energy bin exhibits better contrast for thicker structures.

Figure 18A:
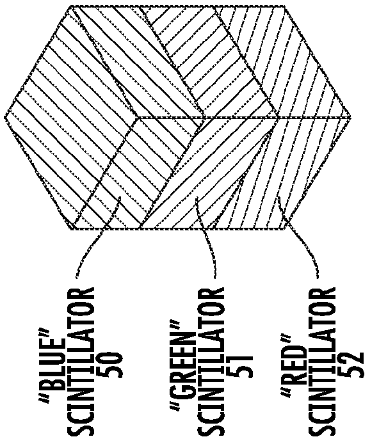
FIG. 18A shows a scintillator made up of stacked scintillators of different colors.
Figure 18B:
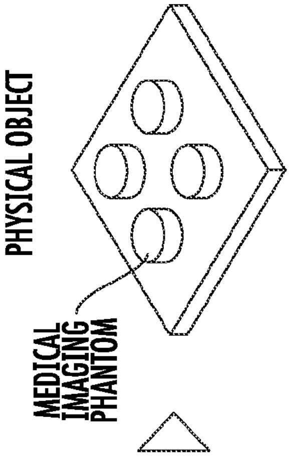
FIG. 18B shows an object to be scanned.

FIG. 18A shows a red-green-blue scintillator made of conventional scintillator materials. The stack includes a blue scintillator 50, a green scintillator 51 and a red scintillator 52. FIG. 18B shows the object to be scanned, which includes copper, iodine, calcium and tissue.

Figure 18C:
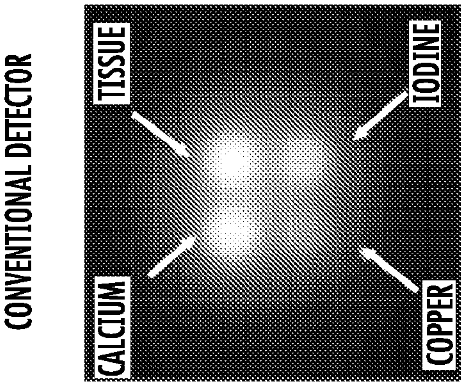
FIG. 18C shows the image produced by a conventional detector.
Figure 18D:
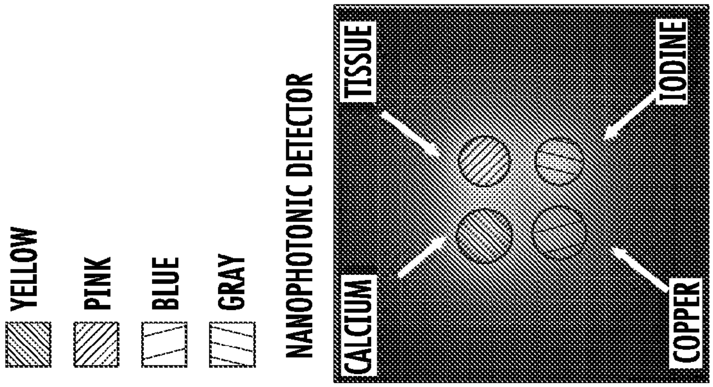
FIG. 18D shows the image produced by a nanophotonic detector.

FIGS. 18C-D show the predicted performance of a "red-green-blue" scintillator stack. FIG. 18C shows a conventional detector, while FIG. 18D shows a nanophotonic detector. Measuring scintillation light at different colors can be realized by using a color camera, a monochrome camera with a set of filters, or a filter mask directly deposited on a monochrome camera. Note that in FIG. 18D, the different materials are displayed with different colors. The copper is mostly blue, iodine is grayish, calcium is yellowish and the tissue is more pink. Thus, a color image allows material information to be extracted as well.

Figure 19:
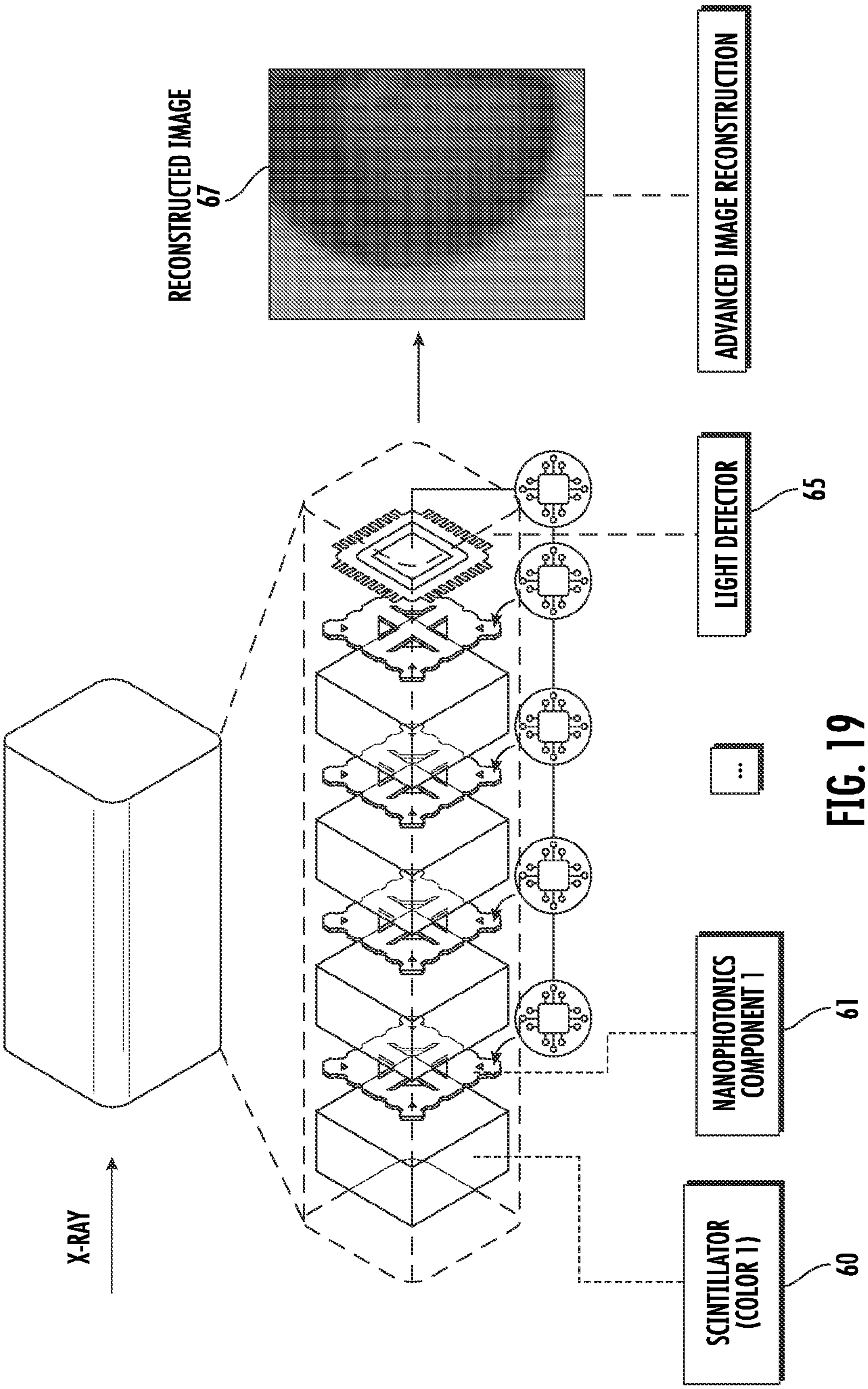
FIG. 19 shows a multi-layer stack nanophotonic scintillator detector design and imaging pipeline.

Further, stacked scintillators may be combined with nanophotonics components to control light at different wavelengths (coming from different x-ray energies) and the generated signal on the sensor. Such a design of a multistack, multicolor scintillator is shown in FIG. 19. In one embodiment, a scintillator 60 emitting a frequency (which may correspond to a color in the visible spectrum), is followed by a nanophonotics component, which may be a surface having any of the patterns described herein. This pairing may be repeated a plurality of times, where each scintillator emits at a different frequency. A detector 65 may collect all of the frequencies emitted by the various scintillators. For instance, the nanophotonics components can be designed to steer light onto different parts of the sensor. Alternatively, they can be discovered by inverse design or optimization to optimize the detector's performance. Lastly, the signal detected can be reconstructed with image processing algorithms, as described earlier in the disclosure to create a reconstructed image 67.

Embodiments

The nanophotonic scintillators used to achieve the functionalities described above may be of the following type:

Geometry

- One-dimensional photonic crystal: a periodic arrangement of thin film layers, whose thicknesses vary between 5 nm and 100 microns.
- Two-dimensional photonic crystals and metasurfaces: two-dimensional periodic arrangement of holes, pillars, or any arbitrary patterns, where the periodicity varies between 5 nm and 100 microns, and each thickness varies between 5 nm and 10000 microns (the total thickness being a function of the HEP energy as explained above)
- Random surfaces on scintillator films: random patterns at the surface of a scintillator with thickness between 5 nm and 100 microns, and each thickness varies between 5 nm and 10000 microns. The typical size of the random pattern may be on the order of 1 nm to 20 microns.
- Multi-layer thin film: a non-periodic arrangement of thin film layers, whose thicknesses vary between 5 nm and 100 microns
- 3D Photonic crystal: a three-dimensional periodic arrangement where the feature size is smaller than the period, and the period itself varies between 5 nm and 100 microns
- A hybrid metallic-dielectric resonator: a dielectric resonator (pillar, hole, or arbitrary pattern) on top of a spacer thin film (metallic or dielectric), on top of a metallic substrate, where each layer thickness and feature size varies in the range 5 nm to 100 microns. The structure may be periodic or not.
- Metallic thin film: similar to the hybrid metallic-dielectric resonator, but with a metallic spacer of smaller thickness (from 0.1 to 500 nm).
- The metallic thin film can be directly deposited on top of a scintillating material.
- The metallic thin film can be embedded in a scintillating material matrix.
- The metallic thin film can be patterned with patterns on the wavelength scale (50 nm-5 microns).
- A two-dimensional material such as hexagonal boron nitride or graphene deposited on a substrate. The two-dimensional material may be single-layer or a few layers.
- An arbitrary patterned nanostructure, whose topology and/or dielectric distribution is optimized through inverse-design to enhance the scintillation yield. The resulting structure may not be periodic. The typical feature size of such structures may vary between 5 nm and 100 microns.
- Amorphous photonic crystal: a locally-periodic arrangement, made, for instance, of colloidal particles. The structure may not present a long-range order. The typical feature size of such structures may vary between 5 nm and 100 microns.

The materials that may be used as scintillators, reflectors, or other components of the above-described structures include:

- Silicon, silicon dioxide (crystalline and amorphous), rare-earth doped silicon
- Dielectric thin films, such as: $SiO_2$, $TiO_2$, $Ta_2O_5$, $Al_2O_3$, $HfO_2$, $V_2O_5$, $VO_2$, Ago, MgO
- Boron nitride (hexagonal and cubic), graphene
- Transition metal dichalcogenides
- Quantum dot and quantum well materials (e.g., CdS, AlGaAs)

- Large-bandgap material such as diamond, boron nitride, AlN
- Semiconducting materials such as GaAs, GaP, GaN, GaInN and quantum well structures (multilayer of GaN/GaInN for instance, or GaAs/InGaAs)
- Metals (and rare earths): Ag, Ta, Ni, Fe, Cr, Cu, Co, FeMn, V, Hf, Gd, Sc, Zn, Sn, Mn, TiN, TaN, Ti, Au, (and Er, Ce, Sc, Y, La, Pr, Nd, Pm, Sm, Eu, Gd, Tb, Dy, Ho, Tm, Yb, Lu)
- Nitride thin films such as AlN, SiN, HAN, GaN (doped or not), InGaN, AlGaN
- Perovskite materials (for instance MAPbX3 and CsPbX3 where X=Br, Cl, I)
- Heavy materials (large Z)-doped dielectric structure (silica, alumina, titanium dioxide, etc.)
- Materials known for their scintillation properties (doped or undoped): NaI, BGO, LSO, YSO, GSO, $BaF_2$, $CaF_2$, $CeBr_3$, Chromox, CLYC, CsI, CsI(Na), CsI(Tl), GGG, GAGG(Ce), GFAG(Ce), $LaBr_3$(Ce), LBC, LSO(Ce), LuAG(Ce), LuAG(Pr), LuAP(Ce), LYSO(Ce), NB(WO), $PbF_2$, PWO, $SrI_2$(Eu), YAG(Ce), YAP(Ce), YSO(Ce), ZnSe(Te), CsI—Tl, CWO.

The present system has many advantages. The various techniques presented to increase scintillation from nanophotonic structures may be utilized in various ways, in the context of HEP detection and imaging. Increasing the scintillation yield, at a given HEP pump intensity, may be utilized to:

- decrease the required HEP exposure (in exposure time or power) to achieve a given scintillation yield,
- reduce signal-to-noise ratios
- reduce the scintillator thickness to achieve greater resolution or greater compactness.

Additionally, the spectroscopic techniques presented in FIGS. 10 and 11A-11B may be utilized to:

- reconstruct HEP spectra for applications in medical imaging, non-destructive testing (NDT), nuclear detection, well logging, etc.
- reconstruct energy-dependent absorption maps from a specimen bombarded with HEP with h different energies, or with a continuum of energies. Such information may be further utilized to reconstruct a 3D spatial profile of the structure with less exposure (in lesser time but also with fewer 2D projections to achieve 3D reconstructions, as is often the case in tomographic reconstruction for medical and NDT).

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. An imaging setup comprising:

a high energy particle (HEP) source emitting HEP of various energies;

a scintillating device, comprising a plurality of stacked subregions, such that different energies penetrate to different depths within the stacked subregions; and wherein each subregion comprises a patterned surface and scintillates at a specific frequency, angle and polarization;

a detector to receive emissions from each stacked subregion; and a reconstruction algorithm to determine an original energy distribution based on a scintillation pattern received from the plurality of stacked subregions, wherein the reconstruction algorithm is selected from the group consisting of convolutional neural networks, compressed sensing solvers, and least-square error optimizers.

2. The imaging setup of claim 1, wherein each subregion is designed by calculating the HEP energy loss distribution or by inverse-design, wherein a structure of each subregion is optimized to best overlap with various HEP energy loss regions.

3. The imaging setup of claim 1, wherein the compressed sensing solvers comprise LISTA, FISTA or iterative solvers.

4. The imaging setup of claim 1, wherein spectroscopic reconstruction can be is achieved with an error of less than 50%.

5. The imaging setup of claim 1, wherein the reconstruction algorithm reconstructs the two-dimensional absorption map as a function of the incident energy.

6. The imaging setup of claim 1, wherein a thickness of the scintillating device is in the range of 1 micron to 10 cm.

7. The imaging setup of claim 1, wherein spectroscopic reconstruction is achieved with an error of less than 20%.

8. The imaging setup of claim 1, wherein spectroscopic reconstruction is achieved with an error of less than 10%.

9. The imaging setup of claim 1, wherein spectroscopic reconstruction is achieved with an error of less than 5%.

10. The imaging setup of claim 1, wherein spectroscopic reconstruction is achieved with an error of less than 1%.

11. The imaging setup of claim 1, wherein spectroscopic reconstruction is achieved with an error of less than 0.1%.

12. The imaging setup of claim 1, wherein spectroscopic reconstruction is achieved with an error of less than 0.01%.

13. An imaging setup comprising:

a high energy particle (HEP) source emitting HEP of various energies;

a scintillating device, comprising a plurality of stacked subregions, such that different energies penetrate to different depths within the stacked subregions; and wherein each subregion comprises a patterned surface and scintillates at a specific frequency, angle and polarization;

a detector to receive emissions from each stacked subregion; and a reconstruction algorithm to determine an original energy distribution based on a scintillation pattern received from the plurality of stacked subregions, wherein the scintillation pattern is optimally sparse for some transform.

14. The imaging setup of claim 13, wherein the transform comprises an edge detection function.

15. The imaging setup of claim 13, wherein each subregion is designed by calculating the HEP energy loss distribution or by inverse-design, wherein a structure of each subregion is optimized to best overlap with various HEP energy loss regions.

16. The imaging setup of claim 13, wherein spectroscopic reconstruction is achieved with an error of less than 50%.

17. The imaging setup of claim 13, wherein the reconstruction algorithm reconstructs the two-dimensional absorption map as a function of the incident energy.

18. The imaging setup of claim 13, wherein a thickness of the scintillating device is in the range of 1 micron to 10 cm.

19. An imaging setup comprising:

a high energy particle (HEP) source emitting HEP of various energies;

a scintillating device, comprising a plurality of stacked subregions, such that different energies penetrate to different depths within the stacked subregions; and wherein each subregion scintillates at a specific frequency, angle and polarization;

a depth imaging device to receive emissions from each stacked subregion;

a detector to receive emissions from the depth imaging device; and a reconstruction algorithm to determine an original energy distribution based on a scintillation pattern received from the plurality of stacked subregions, wherein the reconstruction algorithm is selected from the group consisting of convolutional neural networks, compressed sensing solvers, and least-square error optimizers.

* * * * *